(12) United States Patent
Wenninger et al.

(10) Patent No.: US 10,675,776 B2
(45) Date of Patent: Jun. 9, 2020

(54) PALLET ASSEMBLY SYSTEM

(71) Applicant: ALLIANCE AUTOMATION, LLC, Van Wert, OH (US)

(72) Inventors: Chet Wenninger, Van Wert, OH (US); Karl Klopfenstein, Haviland, OH (US); Josh Foltz, Elida, OH (US); Jason Daniels, Elida, OH (US); Mark Seiler, Angola, IN (US)

(73) Assignee: ALLIANCE AUTOMATION, LLC, Van Wert, OH (US)

( * ) Notice: Subject to any disclaimer, the term of this patent is extended or adjusted under 35 U.S.C. 154(b) by 0 days.

(21) Appl. No.: 16/001,100

(22) Filed: Jun. 6, 2018

(65) Prior Publication Data

US 2018/0345525 A1   Dec. 6, 2018

Related U.S. Application Data

(60) Provisional application No. 62/515,760, filed on Jun. 6, 2017.

(51) Int. Cl.
  *B27F 7/13*  (2006.01)
  *B27M 3/00*  (2006.01)
  (Continued)

(52) U.S. Cl.
  CPC .............. *B27F 7/13* (2013.01); *B25J 11/005* (2013.01); *B27M 3/0073* (2013.01); *B27F 7/09* (2013.01); *B65D 19/38* (2013.01); *B65D 2519/00029* (2013.01); *B65D 2519/00064* (2013.01); *B65D 2519/00099* (2013.01);
  (Continued)

(58) Field of Classification Search
  CPC .......... B23P 19/005; B23P 19/08; B27F 7/09; B27F 7/13; B25J 11/005; B27M 3/0073; B65D 19/38; B65D 2519/00029; B65D 2519/00064; B65D 2519/00273; B65D 2519/00572
  See application file for complete search history.

(56) References Cited

U.S. PATENT DOCUMENTS

| | | | | |
|---|---|---|---|---|
| 2,754,860 A | * | 7/1956 | Moore | ..................... B21J 15/32 221/160 |
| 3,265,273 A | * | 8/1966 | Janus | ..................... B31B 50/00 227/116 |

(Continued)

*Primary Examiner* — Gene O Crawford
*Assistant Examiner* — Kelvin L Randall, Jr.
(74) *Attorney, Agent, or Firm* — Shumaker, Loop & Kendrick, LLP; James D. Miller

(57) ABSTRACT

A fastener delivery system for transporting and dispensing fasteners comprises a source of pressurized air, a dispenser configured for dispensing each of the fasteners into a workpiece, a first pathway providing a first passageway for the fasteners to pass through, and a second pathway providing a second passageway for the fasteners to pass through. Each of the first pathway and the second pathway is placed in selective fluid communication with the source of pressurized air to blow one of the fasteners disposed in the first pathway or the second pathway towards the dispenser. The dispenser includes a toggle feature for alternatingly receiving the fasteners from each of the first pathway and the second pathway. Each of the pathways includes an air brake mechanism for decelerating each of the fasteners as each of the fasteners approaches the dispenser.

12 Claims, 25 Drawing Sheets

(51) Int. Cl.
   *B25J 11/00*  (2006.01)
   *B27F 7/09*   (2006.01)
   *B65D 19/38*  (2006.01)
(52) U.S. Cl.
   CPC .............. *B65D 2519/00273* (2013.01); *B65D 2519/00293* (2013.01); *B65D 2519/00323* (2013.01); *B65D 2519/00333* (2013.01); *B65D 2519/00572* (2013.01)

(56) References Cited

U.S. PATENT DOCUMENTS

| | | | | |
|---|---|---|---|---|
| 3,760,485 A * | 9/1973 | Smith | ............... | B23P 19/006 29/813 |
| 3,866,641 A * | 2/1975 | Mizu | ............... | B25B 23/04 221/9 |
| 3,875,982 A * | 4/1975 | Mizu | ............... | B25B 23/04 221/10 |
| 4,101,054 A * | 7/1978 | Frost | ............... | B23P 19/003 221/225 |
| 4,114,663 A * | 9/1978 | Viner | ............... | B25B 23/04 221/263 |
| 5,715,985 A * | 2/1998 | Letson | ............... | B23P 19/001 227/119 |
| 6,511,061 B1 * | 1/2003 | Ferenczi | ............... | B21J 15/32 221/156 |
| 10,252,368 B2 * | 4/2019 | Benzing | ............... | B23K 26/08 |
| 2014/0182123 A1 * | 7/2014 | Krejci | ............... | B21J 15/142 29/809 |
| 2015/0174711 A1 * | 6/2015 | Hain | ............... | B21J 15/32 29/798 |
| 2017/0320231 A1 * | 11/2017 | Gudim | ............... | B27F 7/13 |

* cited by examiner

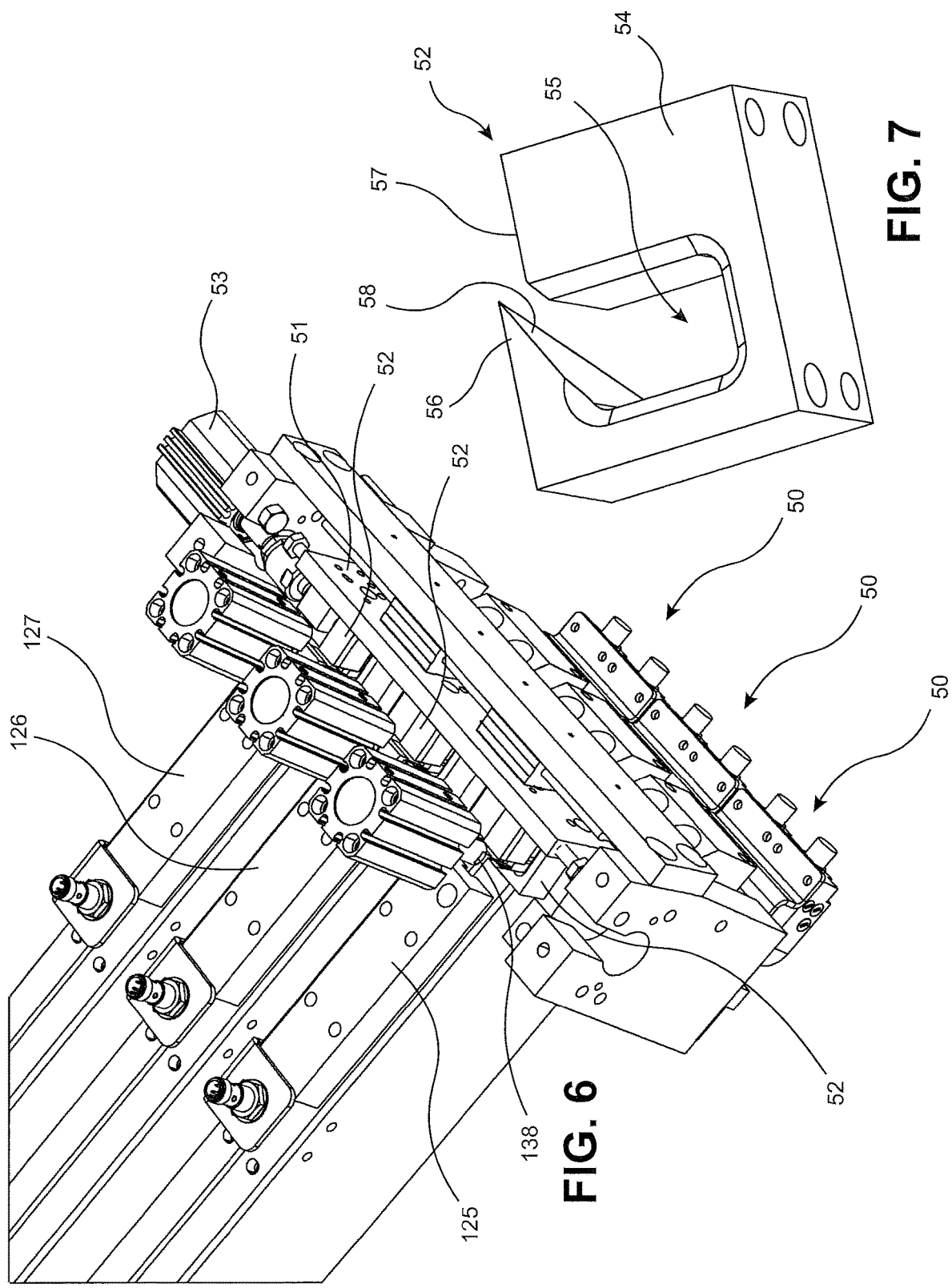

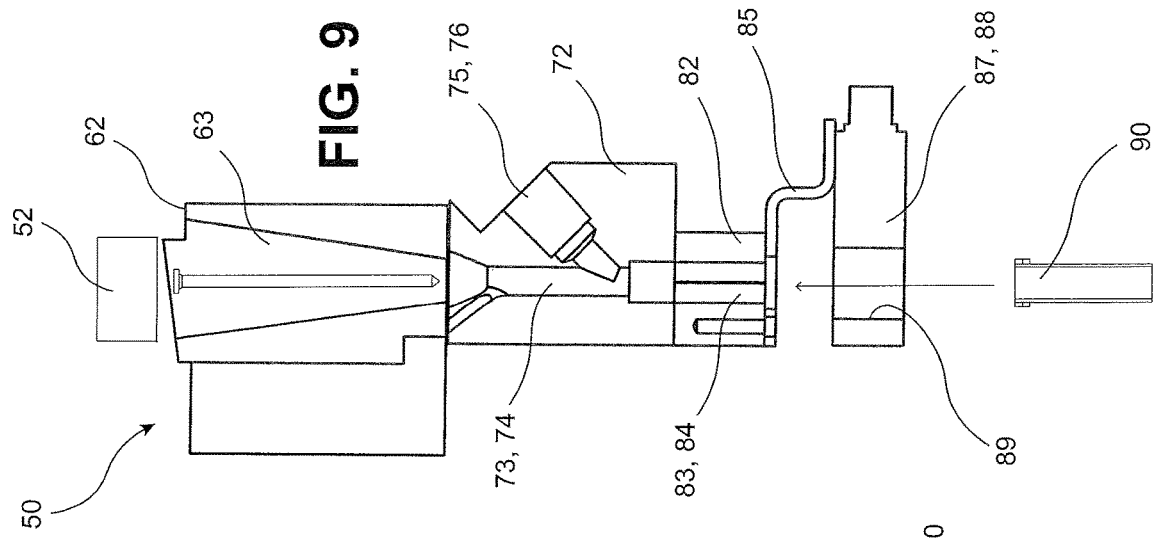
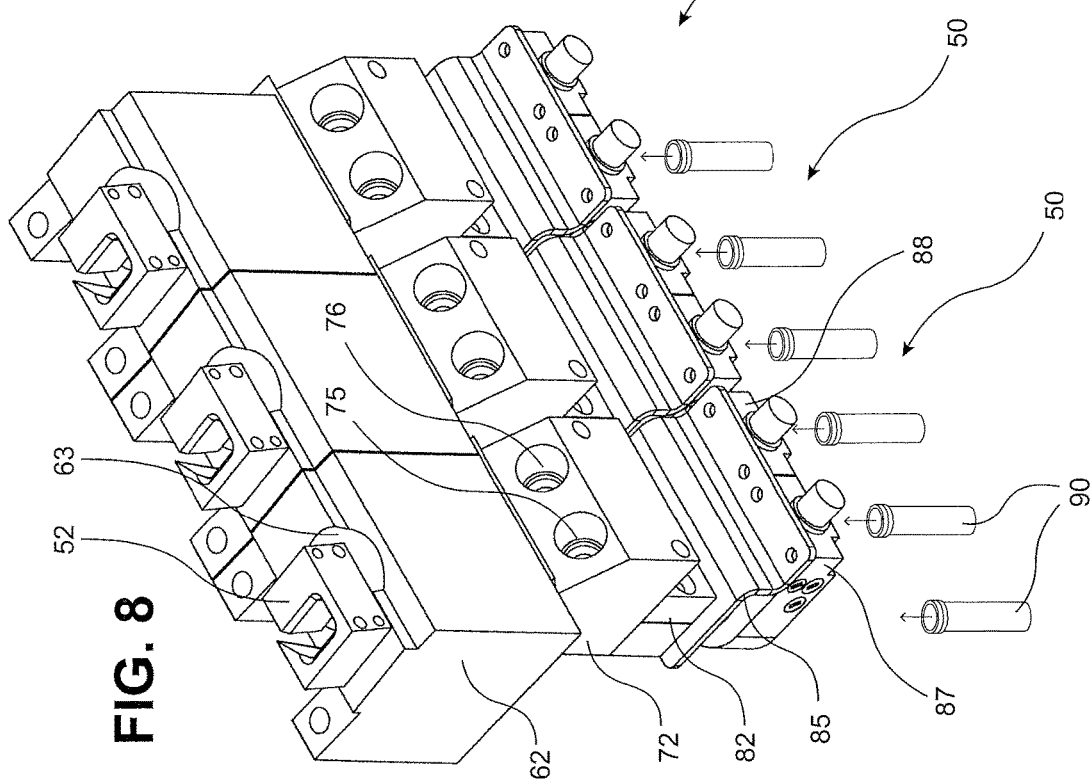

PALLET ASSEMBLY SYSTEM

CROSS-REFERENCE TO RELATED APPLICATION

This patent application claims priority to U.S. Provisional Patent Application Ser. No. 62/515,760, filed on Jun. 6, 2017, the entire disclosure of which is hereby incorporated herein by reference.

FIELD OF THE INVENTION

The invention relates generally a system and method for transporting fasteners to a dispenser using a source of pressurized air and for subsequently dispensing the fasteners from the dispenser and into a workpiece.

BACKGROUND

In modern day manufacturing facilities, it is often desirable to automate various different processes in order to increase output, minimize the introduction of defects, and to increase safety by eliminating potentially dangerous aspects of the manufacturing process. Such automation typically includes the introduction of one or more robotic apparatuses suitable for repeatedly carrying out preselected tasks, wherein a control system is responsible for operation of each of the robotic apparatuses associated with the manufacturing process.

One manufacturing process in need of automation includes the transport and delivery of elongate fasteners, such as traditional nails, for coupling two or more components to each other. Such a manufacturing process may be suitable for the formation of wooden structures such as furniture, building structures, and pallets. Such an automated system may include a "nail gun" or similar end tool for driving the fastener into the structural components in need of coupling after the fasteners has been automatically delivered to the nail gun or end tool. The use of an automated end tool beneficially reduces the need for hand manipulation of such an end tool, wherein hand manipulation of such an end tool traditionally presents an opportunity for misalignment of the fasteners or various different injuries associated with the delivery of the fasteners.

However, the transport and delivery of such fasteners presents numerous different problems that negatively affect the ability to automate such a process. First, it is especially difficult to transport a large quantity of elongate fasteners without potentially damaging the fasteners themselves or a portion of the system responsible for transporting the fasteners. This occurs because such fasteners are traditionally formed from a hard material having various sharp surfaces, wherein the transport of the fasteners may wear away a portion of the system repeatedly interacting with the fasteners. For example, such fasteners may include a pointed surface that routinely and repeatedly contacts a portion of the transport system during transport of the fasteners until the portion of the transport system is damaged, worn, warped, or otherwise rendered unusable. Alternatively, a strengthening of the portion of the transport system against damage from the fasteners may negatively lead to damage to the fasteners themselves during such an interaction, which may in turn lead to the fasteners being insufficient for use in the final structure being assembled by the automated system.

Additionally, it is well known that damaged or inconsistently dimensioned fasteners often tend to present problems when interacting with additional components of a mechanical system. For example, such fasteners having inconsistent surface features may tend to jam a portion of the system, such as the end tool configured for driving the fasteners through the building components, during the process of coupling the building components to each other. Such jamming may lead to an increase of down time as the portion of the system negatively affected may require repeated maintenance.

One solution to the problems associated with the transport of such fasteners may include the use of a cartridge, coil, or other similar assembly of such fasteners that may be suitable for use with such a nail gun or similar end tool. However, the use of a cartridge or coil of such fasteners typically requires repeated reloading of the associated cartridge or coil following the depletion of the associated fasteners. Such reloading may also be accomplished only through a manual process, thereby eliminating the benefits of automating such a process. Additionally, a cartridge or coil having a damaged or worn fastener present therein may further be subject to the type of jamming discussed hereinabove, leading to additional maintenance and downtime each time such a fastener encounters the gun or end tool associated with driving the fasteners.

It would therefore be desirable to produce an automated system for transporting and delivering fasteners used for coupling multiple components to each other.

SUMMARY OF THE INVENTION

In concordance and agreement with the present invention, a system for the transport of elongate fasteners through the use of a pressurized air source has surprisingly been discovered.

In one embodiment of the present disclosure, a fastener delivery system for transporting and dispensing fasteners comprises a source of pressurized air, a dispenser configured for dispensing each of the fasteners into a workpiece, and a first pathway providing a passageway for the fasteners to pass through, wherein the first pathway is placed in selective fluid communication with the source of pressurized air to blow one of the fasteners disposed in the first pathway towards the dispenser.

A method of delivering and dispensing fasteners is also disclosed. The method comprises the steps of distributing a fastener to a pathway leading to a dispenser, blowing the fastener through the pathway toward the dispenser by selectively providing fluid communication between the pathway and a source of pressurized air, and dispensing the fastener from the dispenser.

BRIEF DESCRIPTION OF THE DRAWING FIGURES

The above, as well as other objects and advantages of the invention, will become readily apparent to those skilled in the art from reading the following detailed description of a preferred embodiment of the invention when considered in the light of the accompanying drawings:

FIG. 6 is an enlarged fragmentary view of a plurality of outlet assemblies of the distributor with a portion of the distributor removed to show interior features of each of the outlet assemblies;

FIG. 7 is a perspective view of a pick block of one of the outlet assemblies;

FIG. 8 is a perspective view showing the plurality of the outlet assemblies in isolation;

FIG. 9 is a cross-sectional view taken through one of the outlet assemblies of the distributor;

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
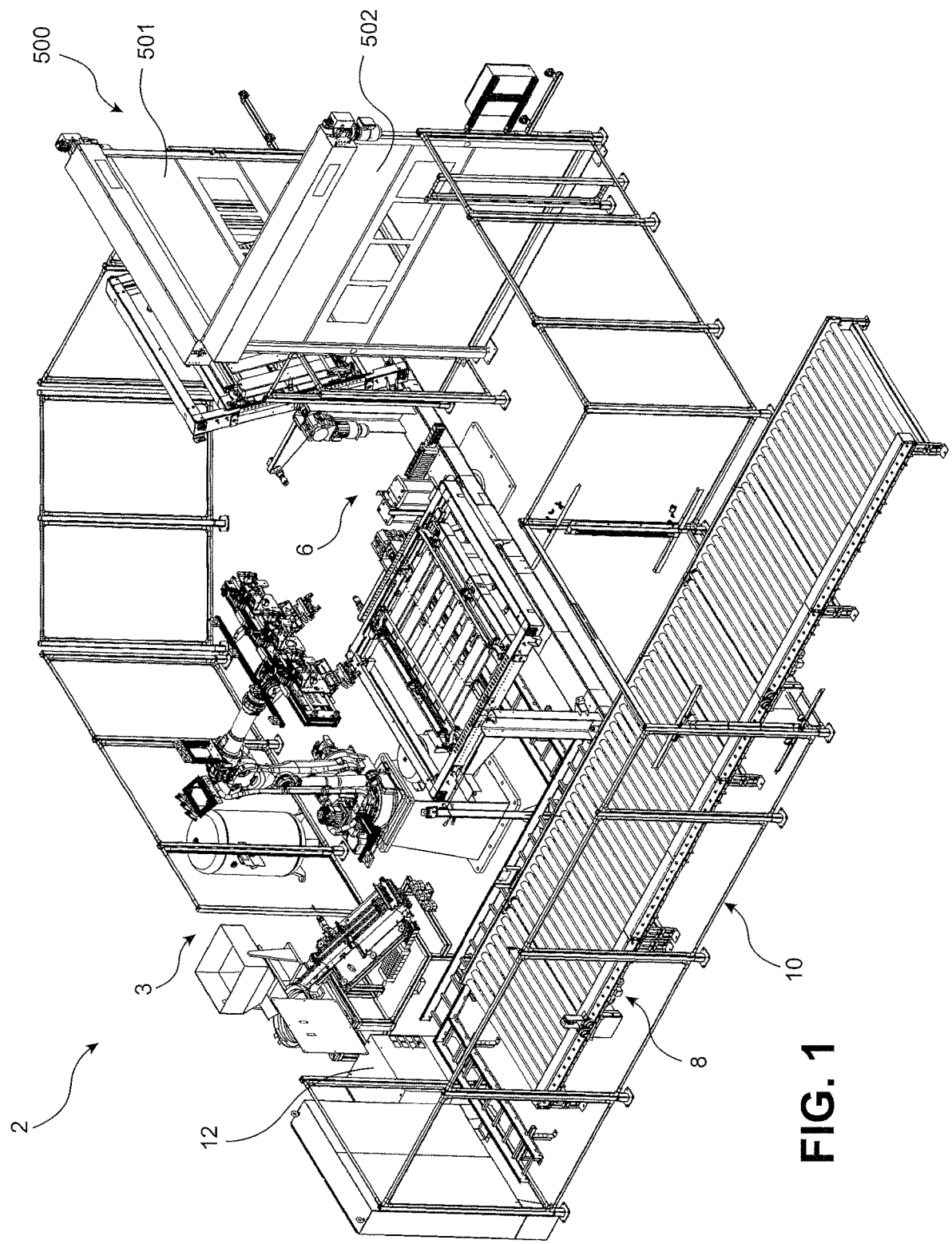
FIGS. 1 and 2 are perspective views of a pallet assembly system according to an embodiment of the instant disclosure.

FIG. 1 illustrates an automated pallet assembly system 2 according to the instant disclosure. Although the automated pallet assembly system 2 is described hereinafter with regards to the formation of pallet structures, one skilled in the art should readily appreciate that various aspects of the present invention may be adapted for use in any system wherein it is desirable to automatically transport a quantity of fasteners to an end tool configured for driving the fasteners into an associated workpiece, wherein the workpiece may include two or more components in need of coupling to each other. For example, the system 2 may be adapted for assembling a plurality of structural components for forming a building structure, a piece of furniture, or the like without necessarily departing from the scope of the present invention. As such, the description hereinafter of a system for forming a pallet structure is not intended to limit the scope of the present invention to those pallet structures as shown and described.

The pallet assembly system 2 according to the instant disclosure includes a fastener delivery system 3, a rotatable fixture assembly 6, an unloading system 8, an enclosure 10, and a controller 12.

As used herein, the term fastener describes any elongate structure suitable for coupling two or more independent components. The fasteners may be driven through a portion of each of the two or more components to couple the components to each other. The fasteners may be traditional nails, wherein each of the nails includes an elongate cylindrical shaft, a substantially pointed first end, and a second end including a head having an increased diameter in comparison to the shaft. The system 2 may be adapted for use with fasteners having any desired set of dimensions without departing from the scope of the present invention. The fasteners may be formed from any suitable material having the requisite physical characteristics or properties. The fasteners may be formed steel, stainless steel, iron, copper, aluminum, bronze, or alloys thereof, as desired. However, it may be desirable for the system 2 to utilize fasteners formed from a ferrous material as such ferrous materials are more easily sensed for determining an instantaneous position of each of the fasteners during transport thereof, as explained in greater detail hereinafter. It may be assumed that subsequent references to fasteners herein are referring to traditional nails having a head and a shaft with a pointed end. One skilled in the art should appreciate that various modifications may be made to the system 2 to accommodate fasteners having slightly different dimensions or configurations.

The controller 12 of the system 2 may be a single controller in signal communication with each controlled component of the system 2, or the controller 12 may comprise a plurality of different controllers in signal communication with each other and with each controlled component of the system 2, as desired. The controller 12 includes a processor, a memory, and at least one instruction set stored to the memory and configured to be processed by the processor. It is understood that the controller 12 is responsible for the actuation of each component described hereinafter as being actuated between multiple different positions unless described otherwise. The controller 12 is also in signal communication with all sensors responsible for determining the condition of any of the fasteners, the components forming the system 2, or the corresponding workpiece acted on by the components of the system 2. The controller 12 operates the various different components of the system 2 in response to the determinations made by the various sensors as discussed in greater detail hereinbelow.

Figure 3:
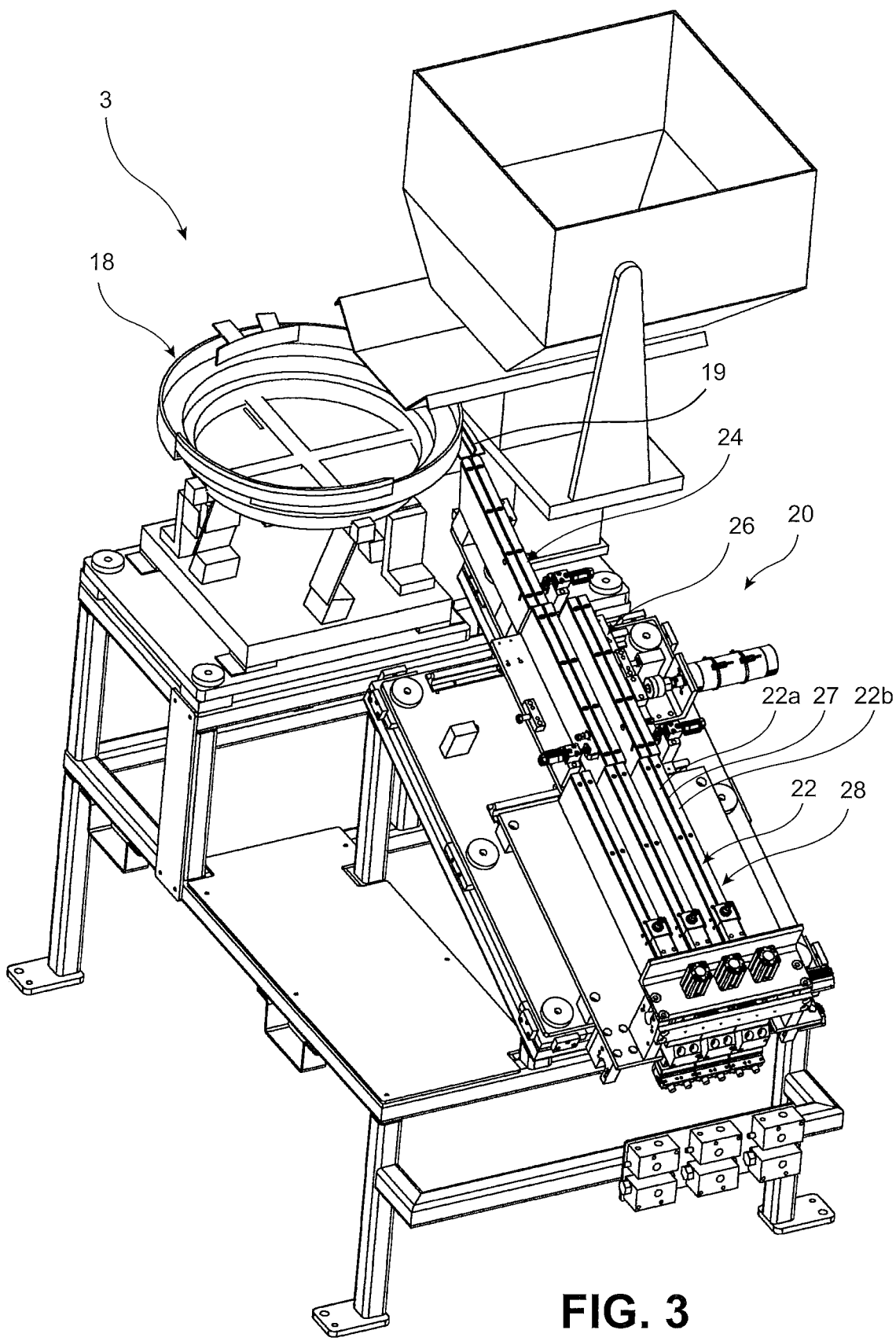
FIG. 3 is a perspective view showing a feeder and a distributor of the pallet assembly system in isolation.

As best shown in FIG. 3, the fastener delivery system 3 includes a feeder 18 and a distributor 20. In the illustrated embodiment, the feeder 18 is a vibratory feeder bowl configured to receive and sort a supply of the fasteners. One example of a suitable vibratory feeder bowl is provided by Fortville Feeders, Inc. However, other types of feeders 18 configured to receive and sort a supply of fasteners will be appreciated by those skilled in the art. The feeder 18 is configured to output a quantity of the fasteners in a single file line as the fasteners are transported through an outlet portion 19 of the feeder 18.

Figure 4:
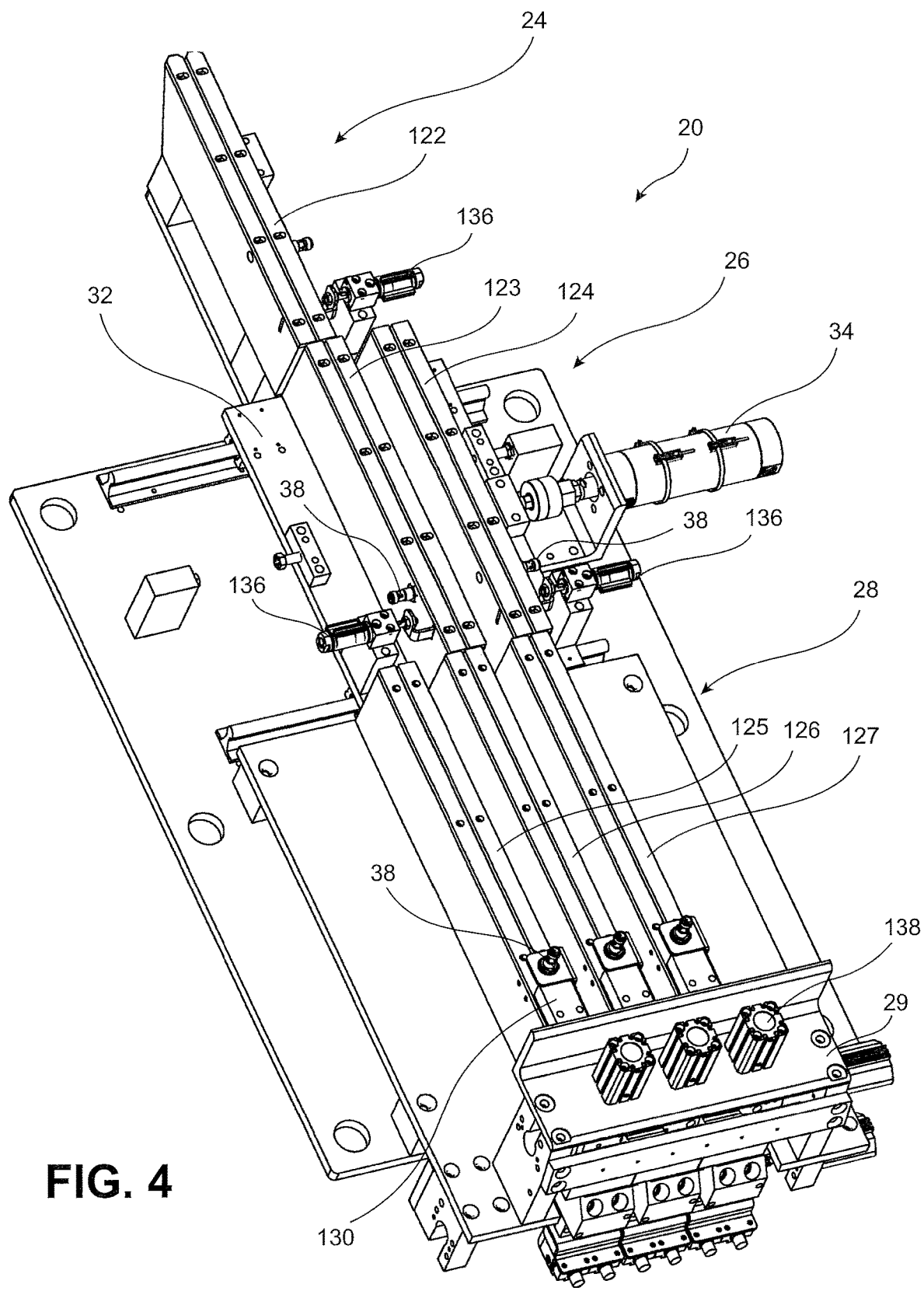
FIG. 4 is a perspective view of a portion of the distributor.

As shown in FIGS. 3 and 4, the distributor 20 includes a feed portion 24 configured to receive individual fasteners from the feeder 18, a switch portion 26, and a distribution portion 28, each comprising one or more tracks 22 configured to distribute the fasteners among three separate outlet assemblies 30.

Each of the tracks 22 of the distributor 20 includes a first block 22a separated from an adjacent and parallel arranged second block 22b to form a gap 27 therebetween. The gap 27 may have a substantially rectangular cross-sectional shape dimensioned to receive the shaft portion of each of the fasteners therein. When the shaft is received in the gap 27, a head of the corresponding fastener is caused to rest on an upper surface of each of the first block 22a and the second block 22b. Each of the tracks 22 is inclined in a manner wherein the fasteners tend to slide down each of the tracks 22 with the head of each of the fasteners sliding on top of the first and second blocks 22a, 22b while the shaft of each of the fasteners depends downwardly in the gap 27 while disposed between the first and second blocks 22a, 22b.

As best shown in FIG. 4, the feed portion 24 includes a single feed track 122, the switch portion 26 includes a first switch track 123 and a second switch track 124, and the distribution portion 28 includes a first distribution track 125, a second distribution track 126, and a third distribution track 127. All of the aforementioned tracks 122, 123, 124, 125, 126, 127 are arranged substantially in parallel as each of the tracks 122, 123, 124, 125, 126, 127 extends from an inlet end for receiving the supply of the fasteners to an outlet end for expelling the supply of the fasteners. The pair of the switch tracks 123, 124 of the switch portion 26 are spaced from each other in a lateral direction arranged perpendicular to the longitudinal direction of each of the tracks 122, 123, 124, 125, 126, 127. The three distribution tracks 125, 126, 127 of the distribution portion 28 are similarly spaced from each other in the lateral direction arranged perpendicular to the longitudinal direction of each of the tracks 122, 123, 124, 125, 126, 127. A first spacing present between the first switch track 123 and the second switch track 124 in the lateral direction is substantially the same as each of a second spacing present between the first distribution track 125 and the second distribution track 126 and a third distance present between the second distribution track 126 of the third distribution track 127.

As best shown in FIG. 3, the outlet portion 19 of the feeder 18 is aligned with the single feed track 122 of the feed portion 24 in a manner wherein the single file supply of the fasteners exiting the outlet portion 19 is subsequently caused to enter the feed track 122 while the fasteners maintain substantially the same orientation (vertically arranged due to the force of gravity). The single feed track 122 is fixed in position relative to the outlet portion 19 of the feeder 18 to continuously receive the supply of the fasteners during operation of the distributor 20.

The switch portion 26 is disposed intermediate the feed portion 24 and the distribution portion 28. As best shown in FIG. 4, the first and second switch tracks 123, 124 of the switch portion 26 are coupled to a moveable carriage 32. The carriage 32 is configured to oscillate between a first position and a second position. In the illustrated embodiment, the carriage 32 is slidably coupled to the distribution assembly by a pair of linear bearings, and is selectively moveable from the first position to the second position by an actuator 34. The actuator 34 may be a pneumatically powered actuator configured for oscillating between the first position and the second position, or other type of actuator such as a hydraulic actuator, for example, or any other type of linear actuator. When the carriage 32 is in the first position, the first switch track 123 is in alignment with each of the single feed track 122 of the feed portion 24 and the second distribution track 126 of the distribution portion 28 while the second switch track 124 is in alignment with only the third distribution track 127 of the distribution portion 28. When the carriage 32 is in the second position, the second switch track 124 is in alignment with each of the single feed track 122 of the feed portion 24 and the second distribution track 126 of the distribution portion 28 while the first switch track 123 is in alignment with only the first distribution track 125 of the distribution portion 28.

The flow of fasteners is alternatingly provided from the single feed track 122 to each of the first switch track 123 and second switch track 124 by moving the carriage 32 from the first position to the second position, and vice versa. Additionally, the flow of fasteners can be continuously distributed to each of the distribution tracks 125, 126, 127 by a repositioning of the carriage 32 and hence the switch tracks 123, 124. Thus, by disposing the oscillating switch portion 26 intermediate each of the feed portion 24 and the distribution portion 28, a flow of the fasteners can be provided to any one of the distribution tracks 125, 126, 127 by one of the switch tracks 123, 124, while the other of the switch tracks 123, 124 is being provided a supply of the fasteners by the feed track 122, thereby maintaining a supply of the fasteners to each of the distribution tracks 125, 126, 127.

Figure 5:
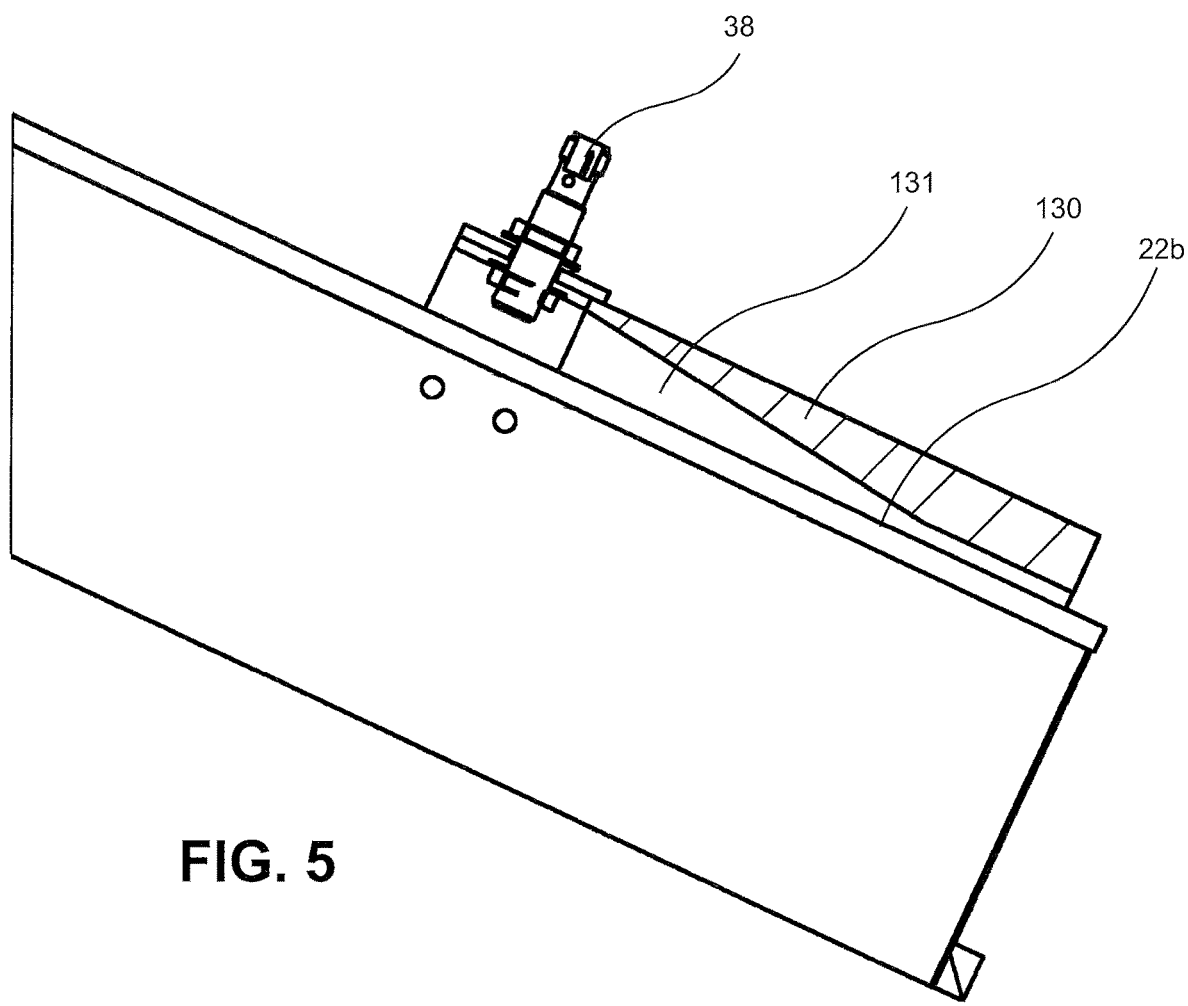
FIG. 5 is a cross-sectional view showing a separating feature of the distributor.

Each of the distribution tracks 125, 126, 127 includes a separating feature 130 disposed adjacent an outlet end thereof. The separating feature 130 is supported on an upper surface of each of the pair of the blocks 22a, 22b forming each of the distribution tracks 125, 126, 127. Each of the separating features 130 includes a longitudinally extending opening 131 formed therein disposed immediately above the gap 27 of each respective distribution tracks 125, 126, 127. The opening 131 has a substantially rectangular cross-sectional shape that is tapered to decrease in height as the opening 131 extends from an inlet end to an outlet end thereof. The tapering of the opening 131 is best shown in FIG. 5, which illustrates a cross-sectional side elevational view taken through a longitudinal center of one of the separating features 130. The decreasing height of the opening 131 is configured to readjust the position of any fasteners that may have become bunched together and/or misaligned as the fasteners collect adjacent an outlet end of each of the distribution tracks 125, 126, 127. Specifically, it has been discovered that the heads of adjacent ones of the fasteners may incidentally overlap each other as the fasteners collect within one of the distribution tracks 125, 126, 127. The tapering of the height of the opening 131 accordingly results in the head of any misadjusted fastener being adjusted back into longitudinal alignment with the heads of adjacent ones of the fasteners to ensure that the fasteners exit each of the distribution tracks 125, 126, 127 while maintaining the single file arrangement of the fasteners. The single file arrangement of the fasteners as the fasteners exit each of the distribution tracks 125, 126, 127 is important to further ensuring that only a single one of the fasteners is expelled from a respective one of the distribution tracks 125, 126, 127 to avoid an instance wherein multiple fasteners are introduced to a portion of the system 2 configured for receiving only a single one of the fasteners at a time.

In alternate embodiments, each of the feed portion 24, the switch portion 26, and the distribution portion 28 may include any number of the tracks 22, wherein the switch tracks of the switch portion are configured to receive the flow of the fasteners from the feed track(s) of the feed portion 26 and to divide the flow of the fasteners among the distribution tracks of the distribution portion 28.

Each of the tracks 22 includes at least one valve configured to control a flow of the fasteners therethrough. In the illustrated embodiment, the feed track 122 and each of the switch tracks 123, 124 includes a gate valve 136, wherein the gate valve 136 is configured to open and close the tracks 22 by selectively disposing a gate within the desired track 22 to obstruct the shaft of the fastener from passing through the corresponding track 22. The gate of the gate valve 136 may obstruct each of the tracks 22 by entering the gap 27 present in each track 22 laterally through an opening formed in one of the blocks 22a, 22b forming each of the tracks 22, wherein the gate is extended or retracted by an actuator configured to linearly displace the gate relative to the track 22. It is understood that alternative valves having alternative forms of actuators may be used, such as a gate that is rotated to block passage through one of the tracks 22, for example.

The distribution tracks 125, 126, 127 each further include a plunger valve 138 configured to contact an upper surface of the distribution tracks 125, 126, 127, thereby obstructing the head of each of the fasteners from passing thereby when the plunger valve 138 is in an extended position. The plunger valve 138 may alternatively be configured to abut the head of a corresponding fastener when the fastener is disposed immediately below the plunger of the plunger valve 138, as desired. Other means of controlling the flow of the fasteners through the tracks 22 will be appreciated by those of ordinary skill in the art, including alternative valve types as discussed above. Each of the plunger valves 138 is disposed immediately above the outlet end of one of the distribution tracks 125, 126, 127 to control an exiting of the fasteners from each of the distribution tracks 125, 126, 127. One or more of the plunger valves 138 may be actuated to block passage of the fasteners through one of the distribution tracks 125, 126, 127 for applications requiring the fasteners from fewer than all three distribution tracks 125, 126, 127, as desired.

The distributor 20 further includes a plurality of presence sensors 38 configured to detect the presence of fasteners within a respective one of the tracks 22. For example, in the illustrated embodiment, each of the switch tracks 123, 124 and each of the distribution tracks 125, 126, 127 include a proximity sensor configured to detect the presence of the fasteners. The proximity sensors may be ferrous material detectors configured to detect the presence of a ferrous material within a known sensing range of the proximity sensor. The proximity sensors may accordingly be configured for use with fasteners having a ferrous material present therein. The proximity sensors may be configured to ascertain the presence of any fasteners within the given track 22 or the proximity sensors may be configured to determine a quantity of the fasteners passing thereby, wherein each instance of a fastener being detected is recorded by the controller 12 as each individual one of the fasteners passes within the sensing range of the corresponding proximity sensor. In alternate embodiments, other types and quantities of sensors may be used without departing from the scope of the present invention, such as sensors having a vision system or a motion detection system, as desired.

As shown throughout FIGS. 6-9, the distributor 20 includes three outlet assemblies 50, with one of the outlet assemblies 50 corresponding to each of the three distribution tracks 125, 126, 127. Each of the outlet assemblies 50 includes a pick block 52, a funnel block 62, a pressurization block 72, and a sensor block 82.

FIG. 6 illustrates the end of the distributor 20 having the outlet assemblies 50, shown without a plate 29 (FIG. 4) used to support each of the plunger valves 138 in order to better illustrate the relationship between each of the distribution tracks 125, 126, 127 and each of the corresponding outlet assemblies 50. The pick blocks 52 are all coupled to a plate 51 that is actuated by an actuator 53. The actuator 53 is configured to linearly displace the plate 51 and all three of the pick blocks 52 coupled thereto in unison and in a lateral direction relative to direction of extension of each of the distribution tracks 125, 126, 127. The actuator 53 oscillates the plate 51 back and forth between a first position and a second position, wherein one cycle of the plate 51 oscillating between the first and second positions corresponds to each of the pick blocks 52 engaging and "picking" one of the corresponding fasteners.

As shown in FIG. 7, which illustrates one of the pick blocks 52 in isolation, each of the pick blocks 52 is formed from a rectangular block 54 having an opening 55 formed therein. The opening 55 defines a pick finger 56 and an indented portion 57 at one end of the rectangular block 54 facing towards each of the distribution tracks 125, 126, 127. The pick finger 56 forms a tapered surface 58 merging with a central portion of the opening 55 while the indented portion 57 is indented relative to an end surface of the pick finger 56 facing towards the distribution tracks 125, 126, 127.

Each of the pick blocks 52 operates as follows. First, one of the fasteners slides towards the outlet end of one of the distribution tracks 125, 126, 127 while the indented portion 57 of the corresponding pick block 52 is in facing relationship the outlet end of the one of the distribution tracks 125, 126, 127. The one of the fasteners slides until contacting the indented portion 57 of the pick block 52 wherein the shaft of the one of the fasteners is disposed beyond the outlet end of the gap 27 of the one of the distribution tracks 125, 126, 127. The plate 51 is in the first position when the fastener is received between the outlet end of the one of the distribution tracks 125, 126, 127 and the indented portion 57 of one of the pick blocks 52. The plate 51 is then actuated via the actuator 53 from the first position and to the second position, thereby causing the pick block 52 to move in a direction wherein the pick finger 56 thereof translates towards the fastener originally placed in abutment with the indented portion 57.

During the motion towards the second position, the pick finger 56 engages the shaft of the fastener and the tapered surface 58 of the pick finger 56 urges the fastener away from the outlet end of the one of the distribution tracks 125, 126, 127 and towards the central portion of the opening 55. Once the plate 51 has reached the second position, the fastener is fully removed from the outlet end of the one of the distribution tracks 125, 126, 127 and is passed through the opening 55 and falls beneath the pick block 52 via the force of gravity. The plate 51 is then actuated back to the first position to finish one full cycle of the actuation of the plate 51. When returned to the first position, the indented portion 57 of the pick block 52 is once again spaced apart from the outlet end of the one of the distribution tracks 125, 126, 127 to receive another one of the fasteners. As should be understood, the plate 51 having all three pick blocks 52 coupled thereto results in the pick blocks 52 simultaneously picking and removing one of the fasteners from all three of the distribution tracks 125, 126, 127 in unison each time the actuator 53 cycles the plate 51 between the first position and the second position. However, as mentioned above, one or more of the plunger valves 138 may be actuated to control the number of the pick blocks 52 engaging and removing one of the fasteners from one of the distribution tracks 125, 126, 127 depending on the given application of the fastener delivery system 3.

Referring now to FIGS. 8 and 9, each of the outlet assemblies 50 further includes one of the funnel blocks 62 disposed immediately beneath one of the pick blocks 52. Each of the funnel blocks 62 includes a substantially conical aperture 63 formed therethrough, wherein the conical aperture 63 of each of the funnel blocks 62 tapers radially inwardly as each of the conical apertures extends away from the corresponding one of the pick blocks 52 and towards a corresponding one of the pressurization blocks 72. Each of the funnel blocks 62 is fixed in position with respect to one of the outlet ends of the distribution tracks 125, 126, 127. Each of the fasteners picked by one of the picks blocks 52 is caused to fall through the opening 55 of the corresponding pick block 52 and then through a corresponding one of the conical apertures 63.

Each of the pressurization blocks 72 includes a first fastener passageway 73 and an independently formed second fastener passageway 74, wherein each of the fastener passageways 73, 74 is configured to receive one of the fasteners from the conical aperture 63 of a corresponding one of the funnel blocks 62. Each of the pressurization blocks 72 further includes a first air inlet port 75 intersecting the first fastener passageway 73 and a second air inlet port 76 intersecting the second fastener passageway 74. The relationship between the fastener passageways 73, 74 and the air inlet ports 75, 76 is further disclosed schematically in FIGS. 11A, 11B, and 33.

One of the sensor blocks 82 is securely fixed to each of the pressurization blocks 72. Each of the sensor blocks 82 includes a first outlet port 83 formed therein and in alignment with the first fastener passageway 73 of the abutting pressurization block 72 and a second outlet port 84 formed therein and in alignment with the second fastener passageway 74 of the abutting pressurization block 72. A flange 85 is coupled to an end face of each of the sensor blocks 82. Each of the flanges 85 includes an offset portion depending downwardly from the end of the corresponding sensor block 82. The offset portion of each of the flanges 85 is affixed to a first presence sensor 87 and a second presence sensor 88. The presence sensors 87, 88 may be proximity sensors, such as the ferrous material detectors configured to detect the presence of a ferrous material within the known sensing range of the detector, as explained hereinabove with reference to the sensors 38 of the distributor 20. Each of the presence sensors 87, 88 includes an opening 89 formed therethrough and in alignment with one of the outlet ports 83, 84.

As shown in FIGS. 8 and 9, a first hose segment 90 may be fed through each of the openings 89 and coupled to one of the outlet ports 83, 84 of each of the sensor blocks 82, thereby resulting in six of the first hose segments 90 extending from the three outlet assemblies 50, with two of the first hose segments 90 extending away from each of the outlet assemblies 50. Each of the first hose segments 90 may include a suitable end fitting for coupling an end of each of the first hose segments 90 to each of the sensor blocks 82.

Figure 10:
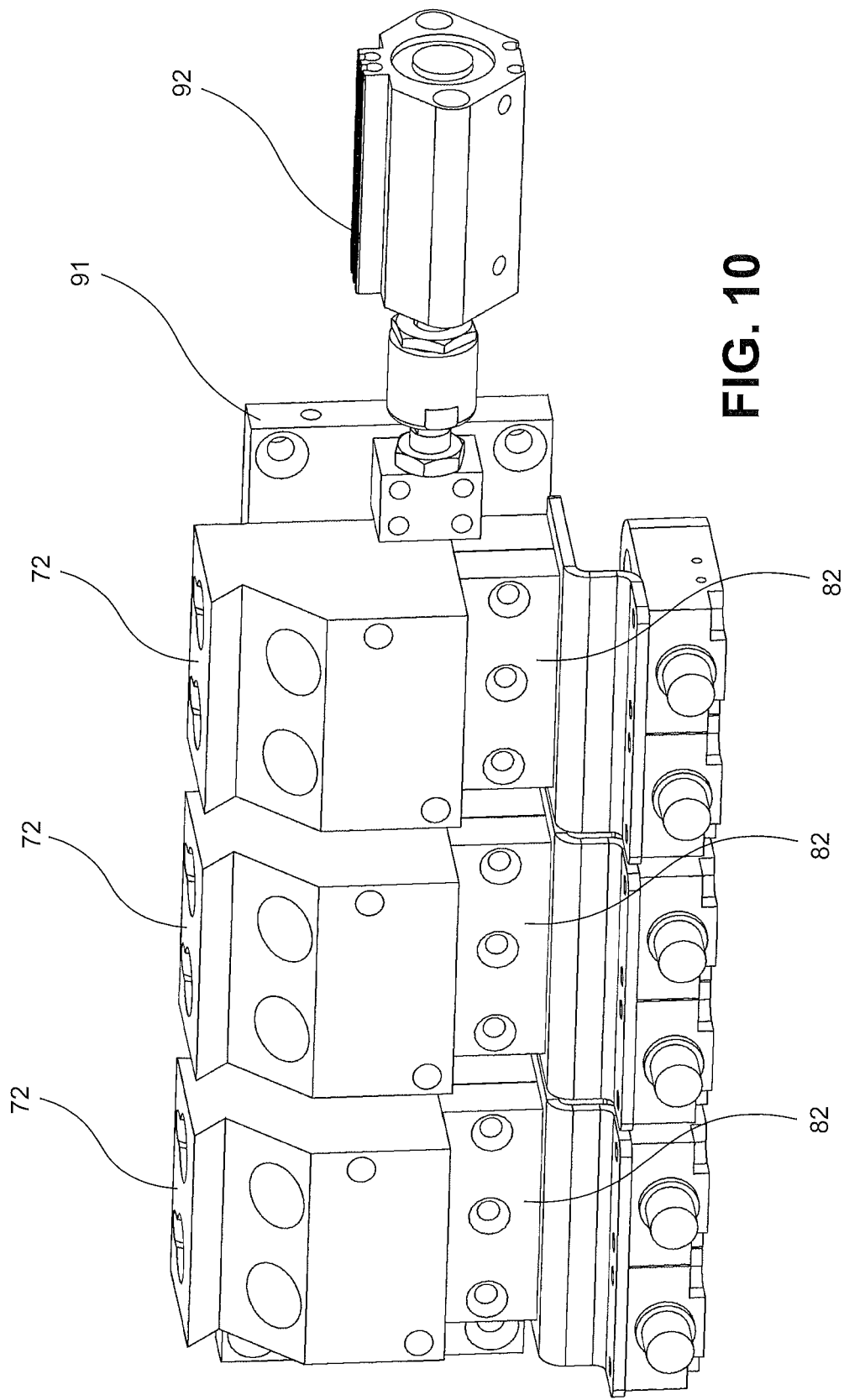
FIG. 10 is a perspective view showing the coupling of a linearly translated plate to portions of each of the outlet assemblies of the distributor.

The pressurization block 72 and the sensor block 82 of each of outlet assemblies 50 are securely coupled to a plate 91. The plate 91 is shown in FIG. 10, which isolates the plate 91, each of the pressurization blocks 72, and each of the sensor blocks 82 from the remainder of the distributor 20. The plate 91 is driven by an actuator 92 configured to translate each of the pressurization blocks 72 and each of the sensor blocks 82 in a direction parallel to the translation of the pick blocks 52. During translation of the plate 91, each of the funnel blocks 62 is maintained in the same position while the plate 91 translates linearly relative to the stationary funnel blocks 62.

The plate 91 is translated between a first position and a second position. The first position corresponds to the first fastener passageway 73 and the first outlet port 83 of each of the outlet assemblies 50 being placed in alignment with the conical aperture 63 formed in the funnel block 62 of the corresponding outlet assembly 50. The second position corresponds to the second fastener passageway 74 and the second outlet port 84 of each of the outlet assemblies 50 being placed in alignment with the conical aperture 63 formed in the funnel block 62 of the corresponding outlet assembly 50. In this way, the actuation of the plate 91 via the actuator 92 causes the fasteners falling through each of the conical apertures 63 to alternate in passing through the first fastener passageway 73 and the second fastener passageway 74. As such, each cycle of the pick blocks 52 being translated by the actuator 53 to engage three of the fasteners adjacent the distribution tracks 125, 126, 127 corresponds to three of the six first hose segments 90 receiving one of the fasteners each time the plate 91 is actuated to one of the first position or the second position during operation of the system 2.

Figure 11A:
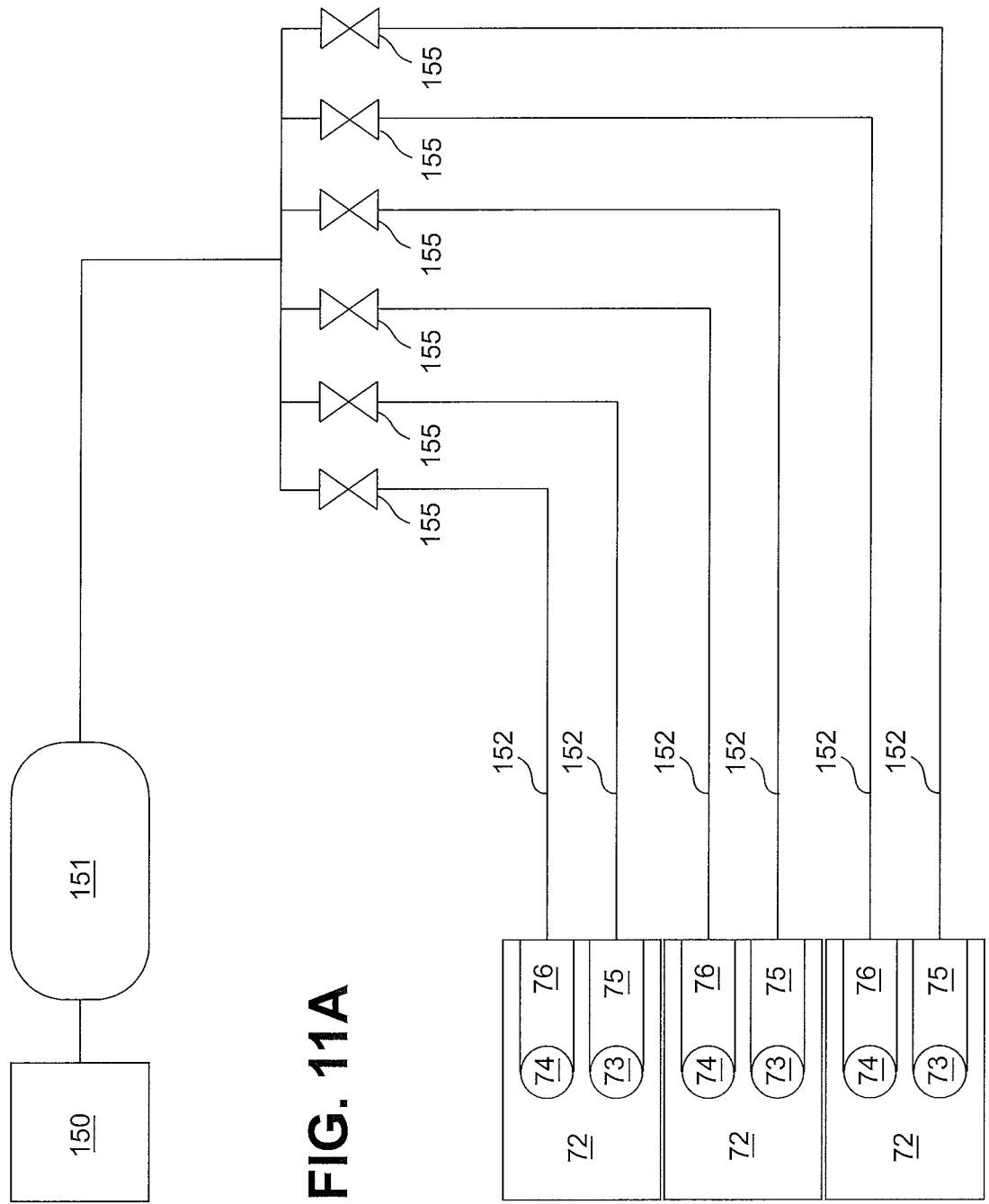
FIG. 11A is a schematic illustration showing how each of the outlet assemblies is fluidly coupled to a source of pressurized air according to one embodiment of the invention.
Figure 11B:
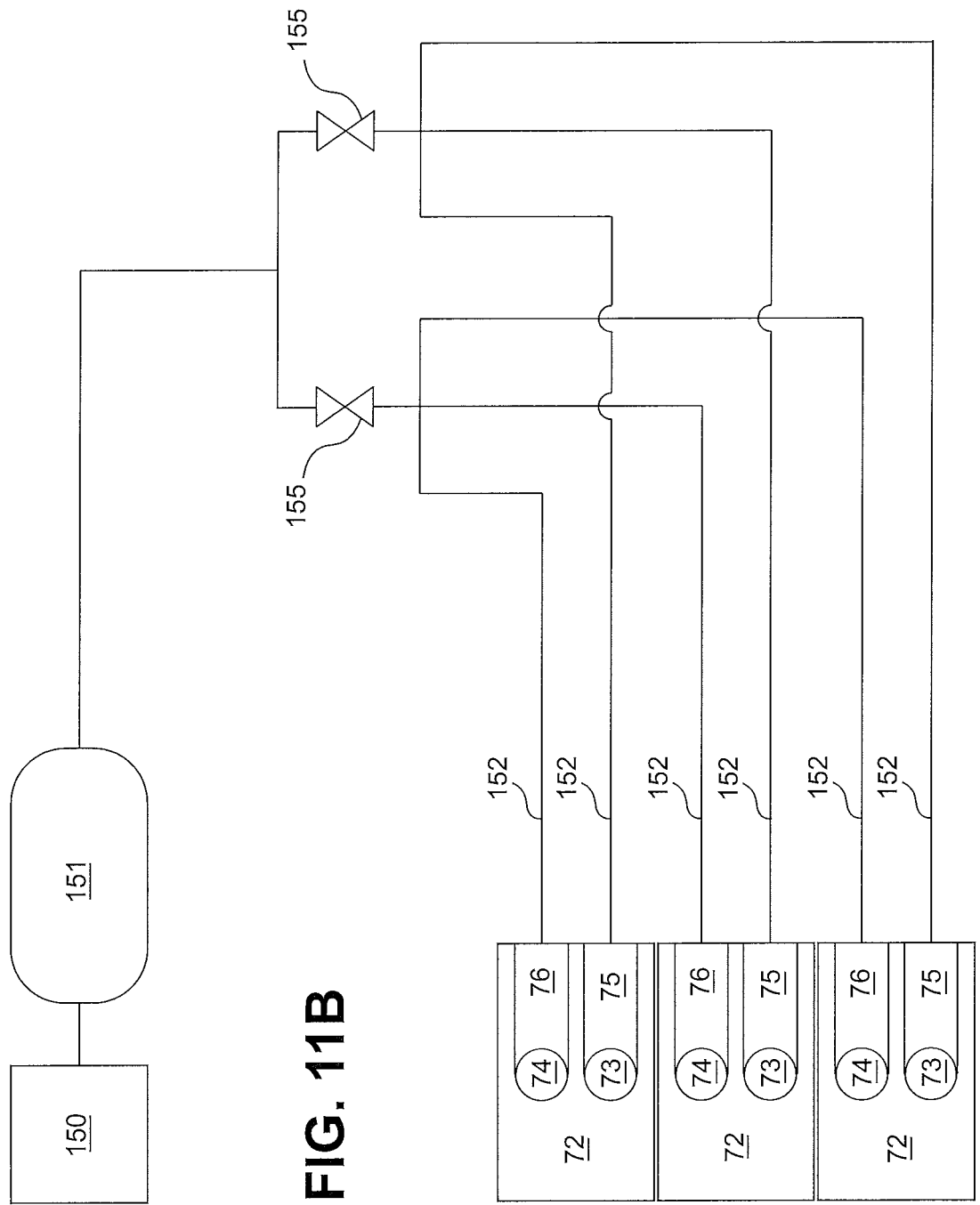
FIG. 11B is a schematic illustration showing how each of the outlet assemblies is fluidly coupled to the source of pressurized air according to another embodiment of the invention.

As best illustrated in FIGS. 11A and 11B, each of the air inlet ports 75, 76 of the pressurization blocks 72 is in fluid communication with a source of pressurized air 150. The source of pressurized air 150 may be a pressurized container in fluid communication with an air compressor 151. The source of pressurized air 150 may alternatively be an air compressor in the absence of a pressurized container, as desired. Each of the air inlet ports 75, 76 may be fluidly coupled to the source of pressurized air 150 by a suitable supply hose or conduit 152. As shown, the source of pressurized air 150 is in fluid communication with six of the supply hoses 152 to distribute the pressurized air to each of the first air inlet port 75 and the second air inlet port 76 of all three of the outlet assemblies 50.

At least one valve 155 is disposed between the source of pressurized air 150 and each of the air inlet ports 75, 76 of each of the outlet assemblies 50 to control a flow of the pressurized air 150 to each of the air inlet ports 75, 76, and hence to each of the corresponding fastener passageways 73, 74. In the embodiment illustrated in FIG. 11A, each of the hoses 152 may correspond to one of the valves 155. Each of the valves 155 is in signal communication with the controller 12. The controller 12 is configured to determine when to operate the compressor 151 and when to open or close each of the valves 155 based on several determinations. The determinations are described hereinafter when describing various sensing mechanisms associated with operation of a manipulator 16 forming a portion of the fastener delivery system 3. The controller 12 accordingly determines when to distribute the pressurized air between the six different air inlet ports 75, 76 via actuation of each of the valves 155 associated with each of the hoses 152.

The embodiment illustrated in FIG. 11B includes only two of the valves 155. One of the valves 155 controls the flow of the pressurized air to each of the first air inlet ports 75 while the other of the two valves 155 controls the flow of the pressurized air to each of the second air inlet ports 76. The reduction in the number of valves 155 is possible as a result of the fasteners being distributed to only one of the first fastener passageways 73 or the second fastener passageways 74 of each of the outlet assemblies 50 at a time, hence all three of the fasteners distributed at a time can be controlled by the actuation of a single one of the valves 155. The controller 12 similarly determines when to operate the compressor 151 as well as when to actuate each of the associated valves 155. One skilled in the art should appreciate that alternative valve systems may be used depending on the timing of the associated system and the number of hoses 152 required for the given application.

Each time one of the fasteners passes through one of the openings 89 of the presence sensors 87, 88 after having fallen through one of the outlet ports 83, 84, the corresponding presence sensor 87, 88 sends a control signal to the controller 12 to inform the controller 12 that one of the fasteners has passed within the sensing range of the corresponding presence sensor 87, 88. The sending of the control signal indicates that the first hose segment 90 passing through the opening 89 of the corresponding presence sensor 87, 88 has received one of the fasteners and is ready to receive a supply of the pressurized air to accelerate the one of the fasteners through the corresponding first hose segment 90.

As explained above and shown in FIGS. 11A and 11B, each of the first fastener passageway 73 and the second fastener passageway 74 of each of the pressurization blocks 72 is fluidly coupled to one of the supply hoses 152 via one of the air inlet ports 75, 76. Flow of the pressurized air through each of the supply hoses 152 is controlled via actuation of the corresponding valve 155. The sensing of the presence of one of the fasteners results in the controller 12 sending a control signal to the corresponding valve 155 to cause a flow of the pressurized air through the supply hose 152 corresponding to the first hose segment 90 having the fastener passing therethrough at the time of the sensing of the fastener. The pressurized air flows from the source of pressurized air 150 through one of the open valves 155, through the corresponding supply hose 152 coupled to the one of the valves 155, through the corresponding air inlet port 75, 76 coupled to the corresponding supply hose 152, through the corresponding fastener passageway 73, 74 intersecting the corresponding air inlet port 75, 76, through the corresponding outlet port 83, 84 extending from the corresponding fastener passageway 73, 74, and then through the corresponding first hose segment 90 having the fastener disposed therein. The sensing of the presence of the fastener accordingly results in a supply of pressurized air eventually encountering the fastener and conveying the fastener through the corresponding first hose segment 90 and towards the manipulator 16. The plate 91 is continuously alternated between the first and second positions via actuation of the actuator 92 to alternate which three of the first hose segments 90 receive one of the fasteners for each cycle of the pick blocks 52 retrieving three of the fasteners.

Figure 33:
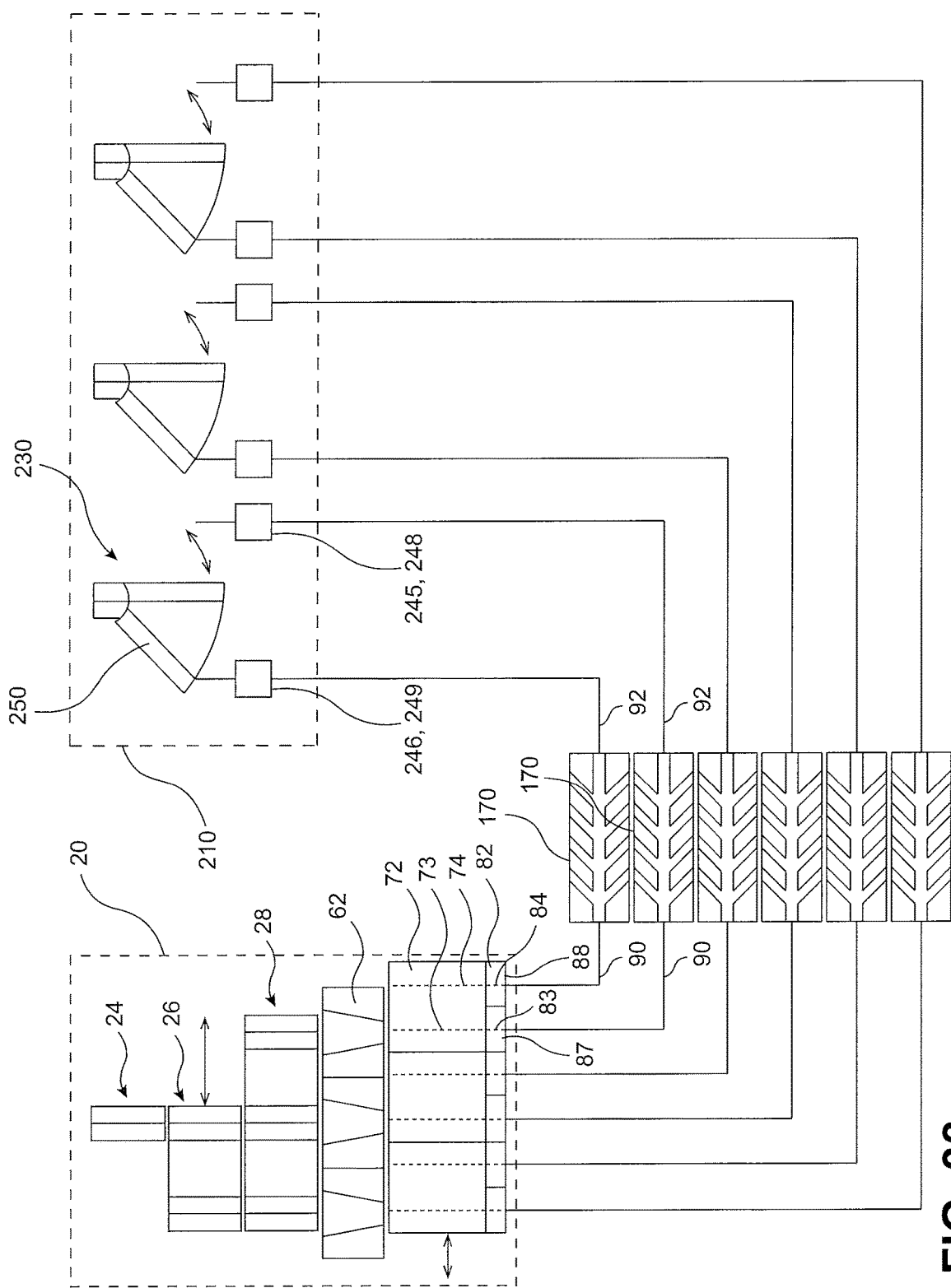
FIG. 33 is a schematic illustration of each of the pathways traversed by one of the fasteners when conveyed towards one of the dispensers.

FIG. 33 schematically summarizes the relationship between the tracks 22 of the distributor 20, the outlet assemblies 50 of the distributor 20, and each of the first hose segments 90 extending away from the outlet assemblies 50. FIG. 33 provides a reference for understanding the relationship between the switching of the supply of the fasteners between the two different sets of the first hose segments 90 due to the manner in which the fasteners are alternatingly provided to the first and second fastener passageways 73, 74 of the pressurization blocks 72.

Each of the first hose segments 90 may be formed from a durable polymeric material suitable for sustaining the wear caused by the fasteners passing therethrough under the force of pressurized air. The first hose segments 90 may for example be formed from nylon. The first hose segments 90 may be arranged to never include any bends or turns having an undesirably low radius of curvature to avoid an instance of one of the fasteners seizing within one of the first hose segments 90. The first hose segments 90 should also have a suitably small inner diameter in comparison to a length of the fasteners to ensure that the fasteners do not flip orientation when passing through the first hose segments 90. The fasteners are configured to enter each of the first hose segments 90 with the pointed end of the fastener pointing in the direction of travel of the fastener through each of the first hose segments 90. As such, the head of the fastener forms a suitable surface for the flow of the pressurized air to convey the fastener through the corresponding first hose segment 90 as the head of the fastener occupies a portion of the flow cross-section of each of the first hose segments 90.

Figure 12:
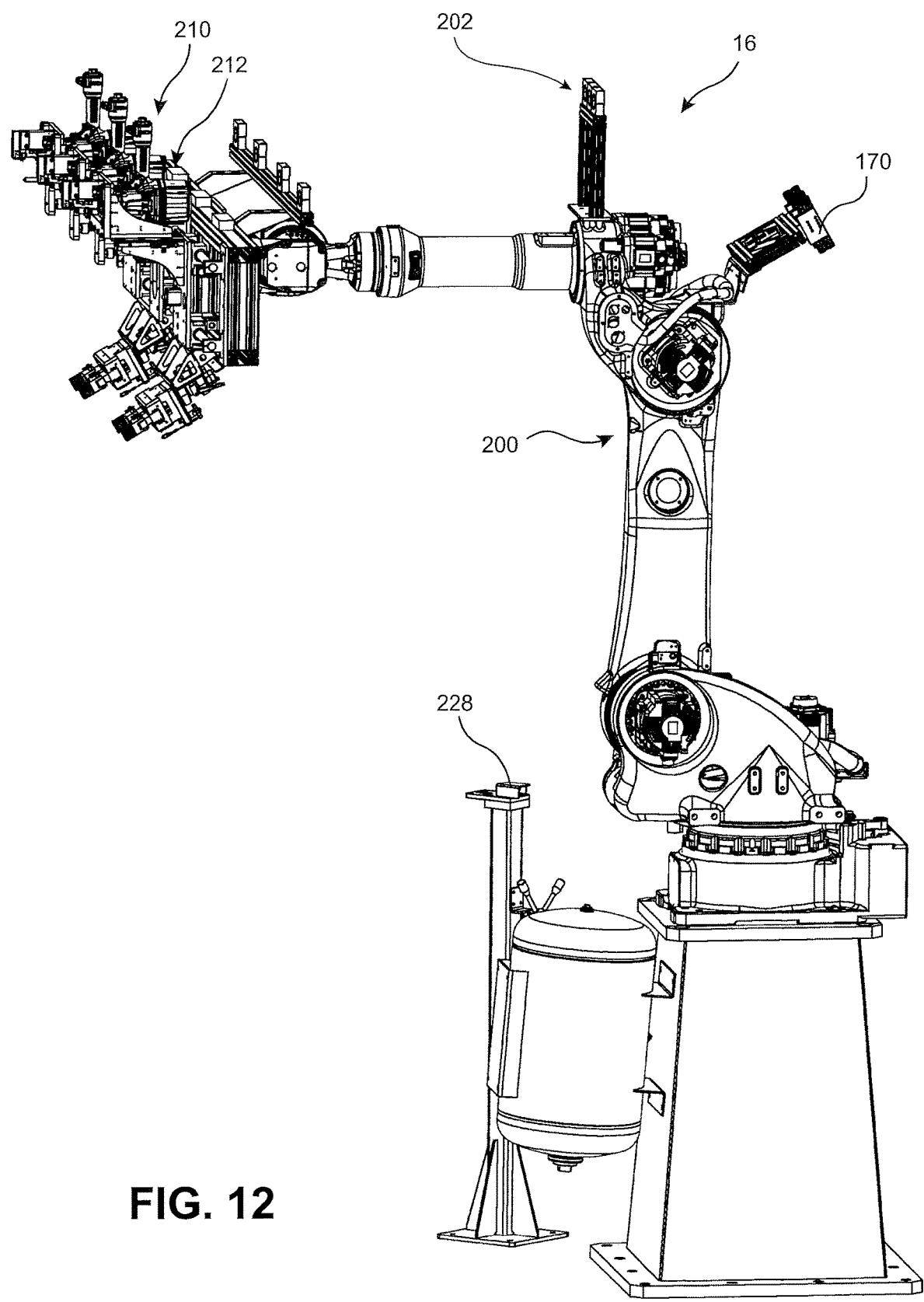
FIG. 12 is a perspective view showing a manipulator of the pallet assembly system.

FIGS. 12 illustrates the manipulator 16 forming a portion of the fastener delivery system 3 of the pallet assembly system 2. The manipulator 16 comprises a multi-axis robotic arm 200 disposed on a base and an end of arm tool (EOAT) 210 coupled to an end of the multi-axis robotic arm 200. The multi-axis robotic arm 200 of the system may be a six-axis robotic arm capable of high-speed maneuvers. One example of a suitable robotic arm 200 is a model MH180 sold by Yaskawa America, Inc. Suitable substitutes will be appreciated by those of ordinary skill in the art. The robotic arm 200 may include additional or fewer degrees of freedom while remaining within the scope of the present invention.

The manipulator 16 is generally positioned intermediate each of the distributor 20, the fixture assembly 6, and the unloading system 8, wherein the robotic arm 200 can provide fasteners to a pallet being assembled on the fixture assembly 6 before delivering the assembled pallet to the unloading system 8. However, the manipulator 16 may be positioned in any location wherein the EOAT 210 can reach each of the fixture assembly 6 and the unloading system 8.

The manipulator 16 further includes a plurality of air brake mechanisms 170 disposed thereon. As shown in FIG. 12, the air brake mechanisms 170 may be disposed on the manipulator 16 adjacent a central joint of the robotic arm 200 intermediate the base 201 and the EOAT 210.

Figure 13:
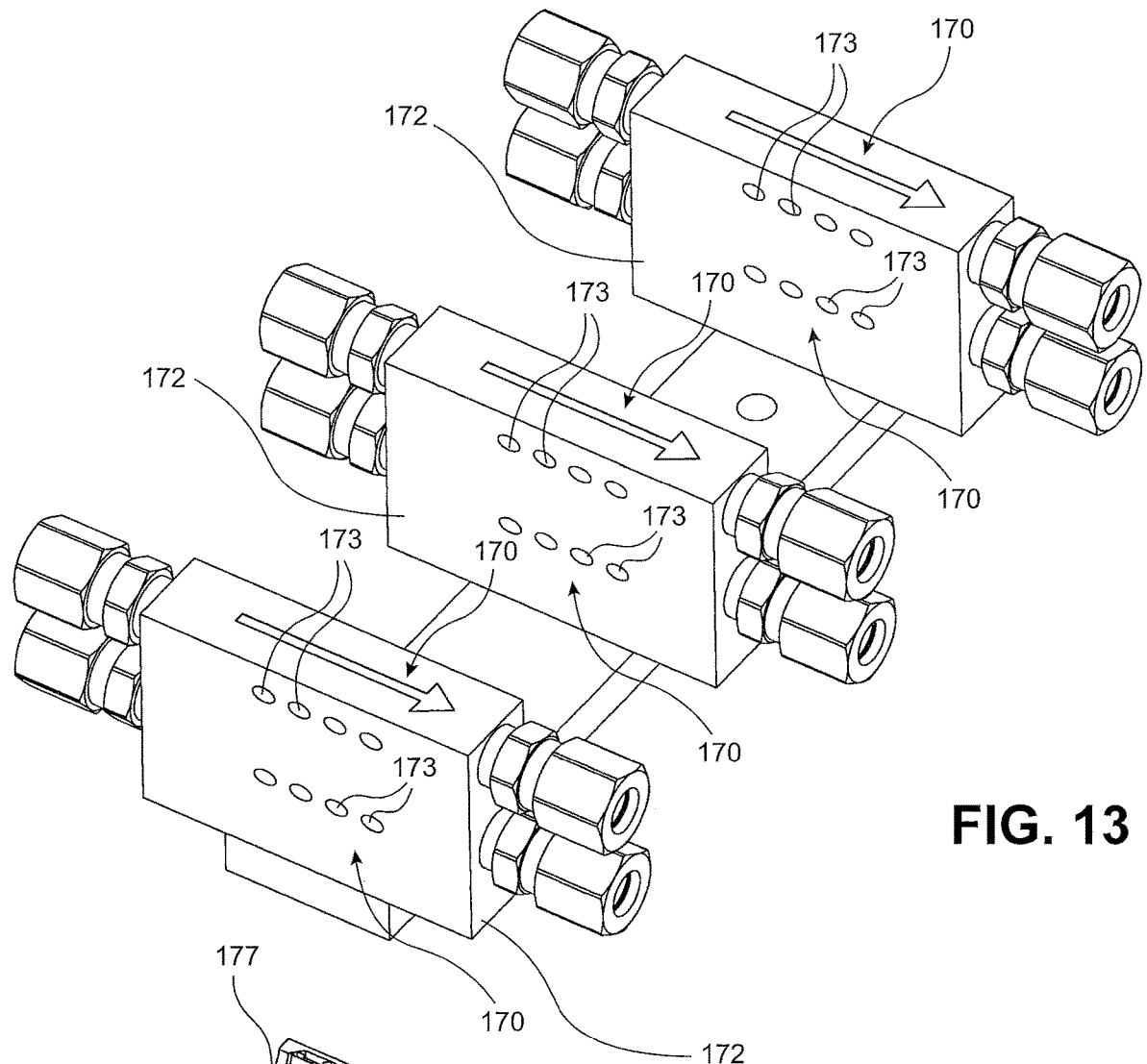
FIG. 13 is a perspective view showing a plurality of air brake mechanisms in isolation.
Figure 14:
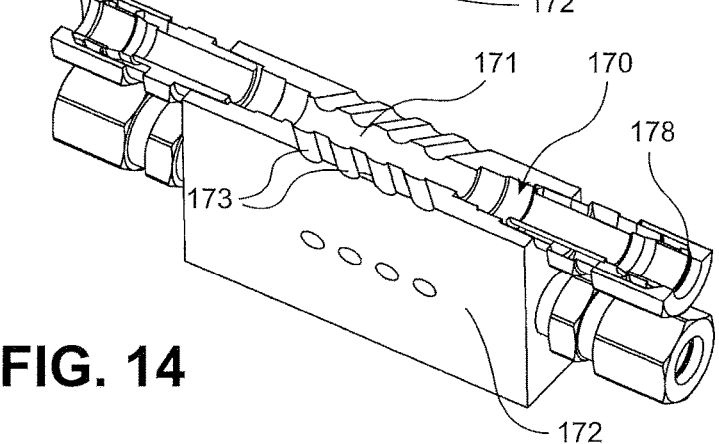
FIG. 14 is a cross-sectional view taken through a center of one of the air brake mechanisms.

FIGS. 13 and 14 illustrate the air brake mechanisms 170 in isolation to better disclose the features thereof. Each of the air brake mechanisms 170 includes an axially extending and cylindrically shaped fastener passageway 171 formed in a body 172 thereof. Each of the fastener passageways 171 is configured for receiving one of the fasteners therethrough with a direction of travel of the fasteners indicated by the arrows shown in FIG. 13. A first end 177 of each of the fastener passageways 171 is coupled to an end of a corresponding one of the first hose segments 90 formed opposite the end coupled to one of the outlet assemblies 50. A second end 178 of each of the fastener passageways 171 is coupled to an end of a corresponding second hose segment 95 (FIG. 33) configured for carrying the fasteners away from each of the air brake mechanisms 170 and towards the EOAT 210.

Each of the air brake mechanisms 170 further includes a plurality of escape openings 173 formed in the body 172. The air brake mechanisms 170 are illustrated in FIG. 14 as including a first set of the escape openings 173 formed diametrically opposite a second set of the escape openings 173, but alternative configurations may be used without departing from the scope of the present invention. Each of the escape openings 173 is a void in the body 172 extending at least partially in a radially outward direction and at least partially in an axial direction of the corresponding fastener passageway 171. The escape openings 173 are shown in FIG. 14 as being arranged at about 45 degrees with respect to the axial direction of the fastener passageway 171, but alternative angles may be utilized. The escape openings 173 are angled in a manner wherein each of the escape openings 173 extend in the direction of travel of each of the fasteners through the corresponding fastener passageway 171 as each of the escape openings 173 extend radially outwardly away from the fastener passageway 171.

The escape openings 173 allow for a portion of the pressurized air entering each of the fastener passageways 171 through the first end 177 thereof to be expelled in the radially outward direction to reduce the pressure of the pressurized air when reaching the second end 178 of each of the fastener passageways 171. The angling of the escape openings 173 in the direction of travel of the fasteners aids in preventing a dramatic change in the flow direction of the escaping air, thereby preventing undesirable flow characteristics at the entry to each of the escape openings 173 that could frustrate the passage of one of the fasteners through the corresponding fastener passageway 171.

The exiting of a portion of the pressurized air acts as a brake mechanism for decelerating the speed of each of the fasteners as each of the fasteners transitions from the corresponding first hose segment 90 to the corresponding second hose segment 95 via a corresponding one of the air brake mechanisms 170. The fasteners may be continuously accelerated once the pressurized air is first introduced into each of the first hose segments 90 until the fasteners reach a corresponding one of the air brake mechanism 170. The air brake mechanisms 170 are essential for slowing the speed of the fasteners as the fasteners are otherwise subject to potential damage as the fasteners reach subsequent components of the EOAT 210. The slowing of the fasteners also tends to prevent wear or damage to any components encountering the fasteners downstream of the air brake mechanisms 170 due to the reduced speed.

The air brake mechanisms 170 are shown in FIG. 13 as being formed as sets of two in three different bodies 172, but any configuration of the air brake mechanisms 170 may be used without departing from the scope of the present invention so long as the relationship between the fastener passageway 171 and the escape openings 173 of each of the air brake mechanisms 170 is maintained. For example, the air brake mechanisms 170 may each be formed in an independent body 172 as opposed to the three bodies 172 shown in FIG. 13, as desired. The air brake mechanisms 170 may also be fixed in position relative to the distributor 20 rather than being coupled to the maneuverable manipulator 16, depending on the given application.

The second hose segments 95 may have the same general characteristics as the first hose segments 90, such as being formed from nylon while having dimensions and curvature suitable for passing the fasteners therethrough. Each of the six of the first hose segments 90 corresponds to one of the second hose segments 95, being indirectly coupled thereto via a corresponding one of the air brake mechanisms 170, as shown with renewed reference to FIG. 33.

Each set of the corresponding first and second hose segments 90, 95 forms an independent pathway to be traversed by a supply of the fasteners as delivered by the distributor 20. Each of the pathways is in fluid communication with supply of the pressurized air for blowing the fasteners through the pathways and towards the EOAT 210, where the fasteners can be applied to a pallet or similar workpiece. However, it is understood that each of the pathways may be formed by any number of hoses and any number of intermediate components or connections without necessarily departing from the scope of the present invention. Furthermore, the pathways may be formed by pipes or conduits other than the flexible hoses 90, 95, so long as the pathways are in fluid communication with the source of pressurized air 150 in a manner ensuring the blowing of the fasteners through the entirety of the pathway. However, it has been found that the absence of one of the air brake mechanisms 170 along each of the pathways can negatively affect operation of the system 2, hence all possible pathways may desirably include one of the air brake mechanisms 170 for increasing the durability of the system 2 against wear and damage.

As shown in FIG. 12, the robotic arm 200 may include various different routing guides 202 disposed thereon. Each of the routing guides 202 is configured to receive a portion of one or more of the first hose segments 90 or the second hose segments 95 therethrough for guiding the hose segments 90, 95 towards the EOAT 210 without unnecessarily subjecting the hose segments 90, 95 to any turns or bends that are too sharp to accommodate the dimensions of the fasteners passing therethrough.

Figure 15:
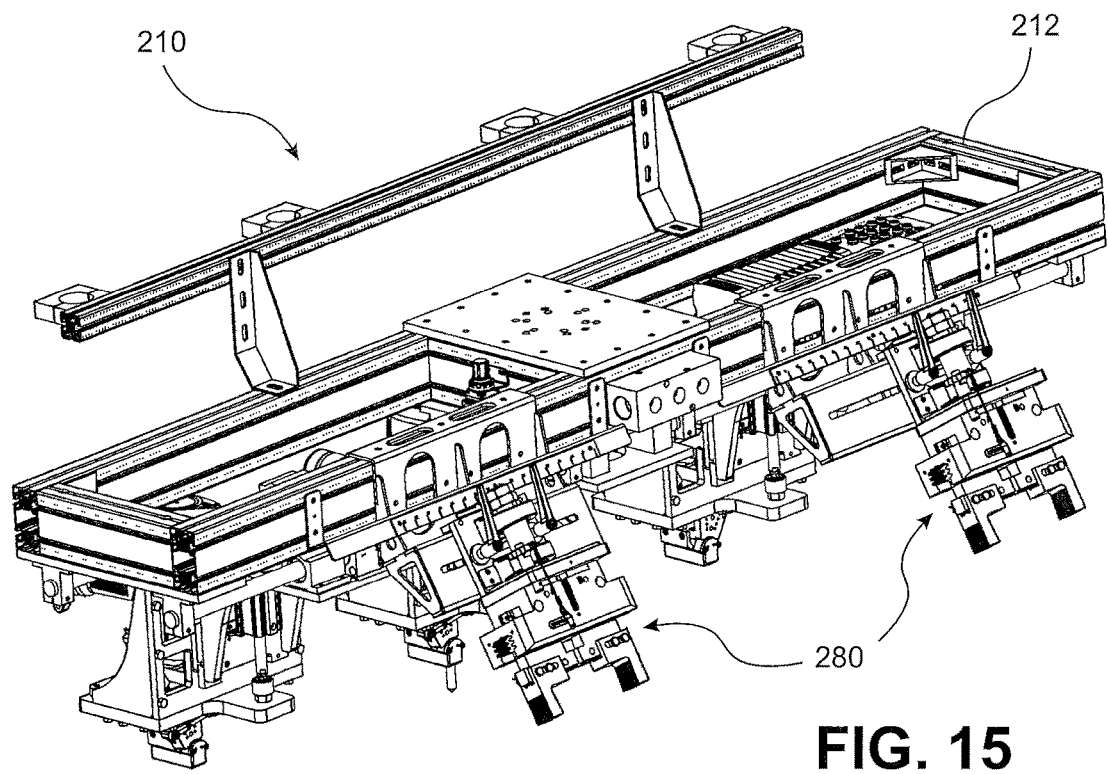
FIGS. 15 and 16 are perspective views of an end of arm tool of the manipulator including a plurality of grippers and a plurality of dispensers coupled thereto.
Figure 16:
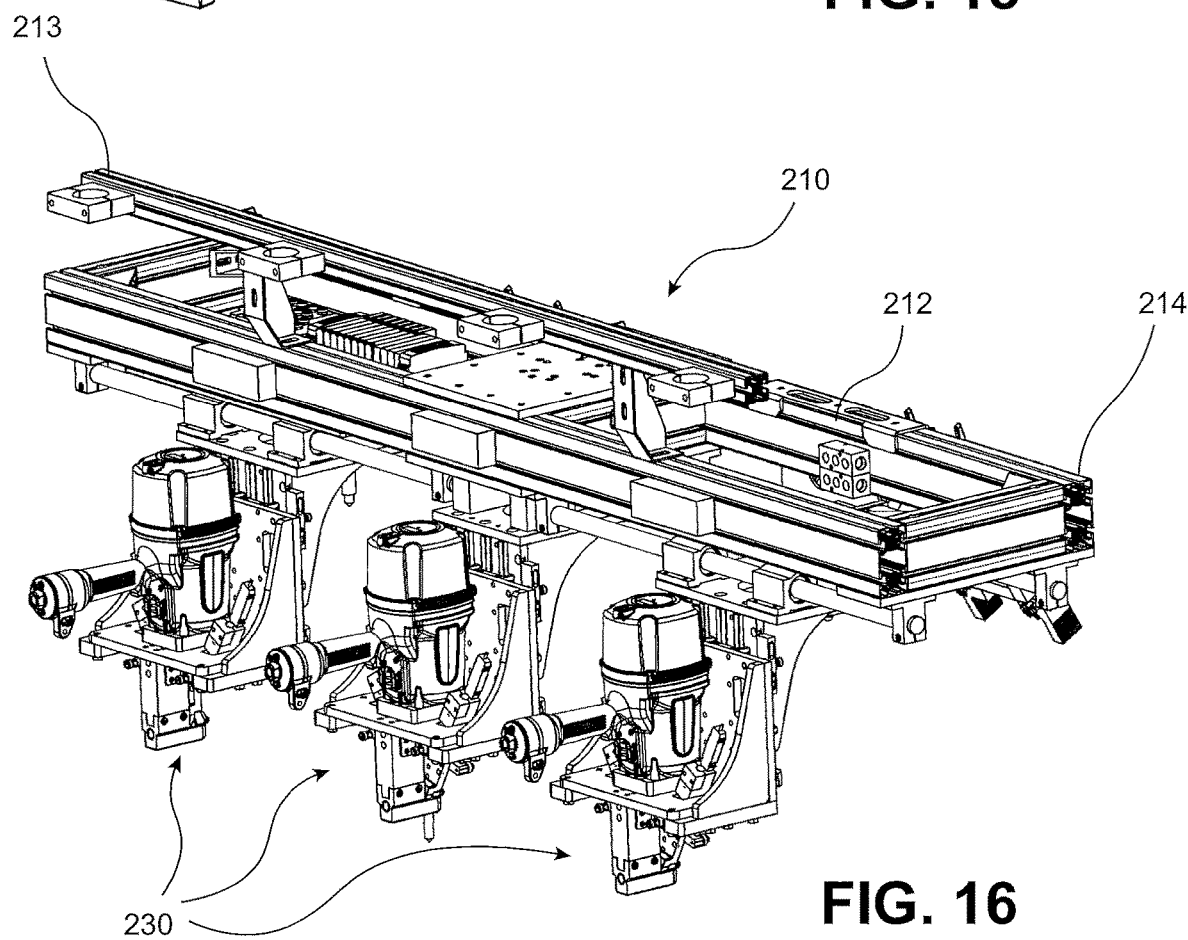

The EOAT 210 includes a frame assembly 212, a plurality of dispensers 230 configured to linearly drive the fasteners into a corresponding workpiece, and a plurality of grippers 280 configured to grasp a workpiece in need of the fasteners. The EOAT 210 is shown in FIG. 12 with each of the dispensers 230 oriented horizontally while FIGS. 15 and 16 illustrate the EOAT 210 in isolation while each of the dispensers 230 is instead oriented vertically. It should be understood that the degrees of freedom of the robotic arm 200 allow for the dispensers 230 to be utilized while in any suitable orientation including orientations alternative to those shown and described herein. For the application disclosed herein, it is assumed that the dispensers 230 are configured to dispense the fasteners while the fasteners are oriented vertically.

The EOAT 210 is shown as including three of the dispensers 230 and two of the grippers 280. The frame assembly 212 extends from a first end 213 to a second end 214 thereof. One of the dispensers 230 is disposed centrally relative to the frame assembly 212, another of the dispensers 230 is disposed toward the first end 213 of the frame assembly 212, and yet another of the dispensers 230 is disposed toward the second end 214 of the frame assembly 212. The centrally located dispenser 230 is fixed relative to the frame assembly 212 while the other two of the dispensers 230 formed to either side of the centrally located dispenser 230 are adjustable in position relative to the longitudinal direction of the frame assembly 212.

Figure 17:
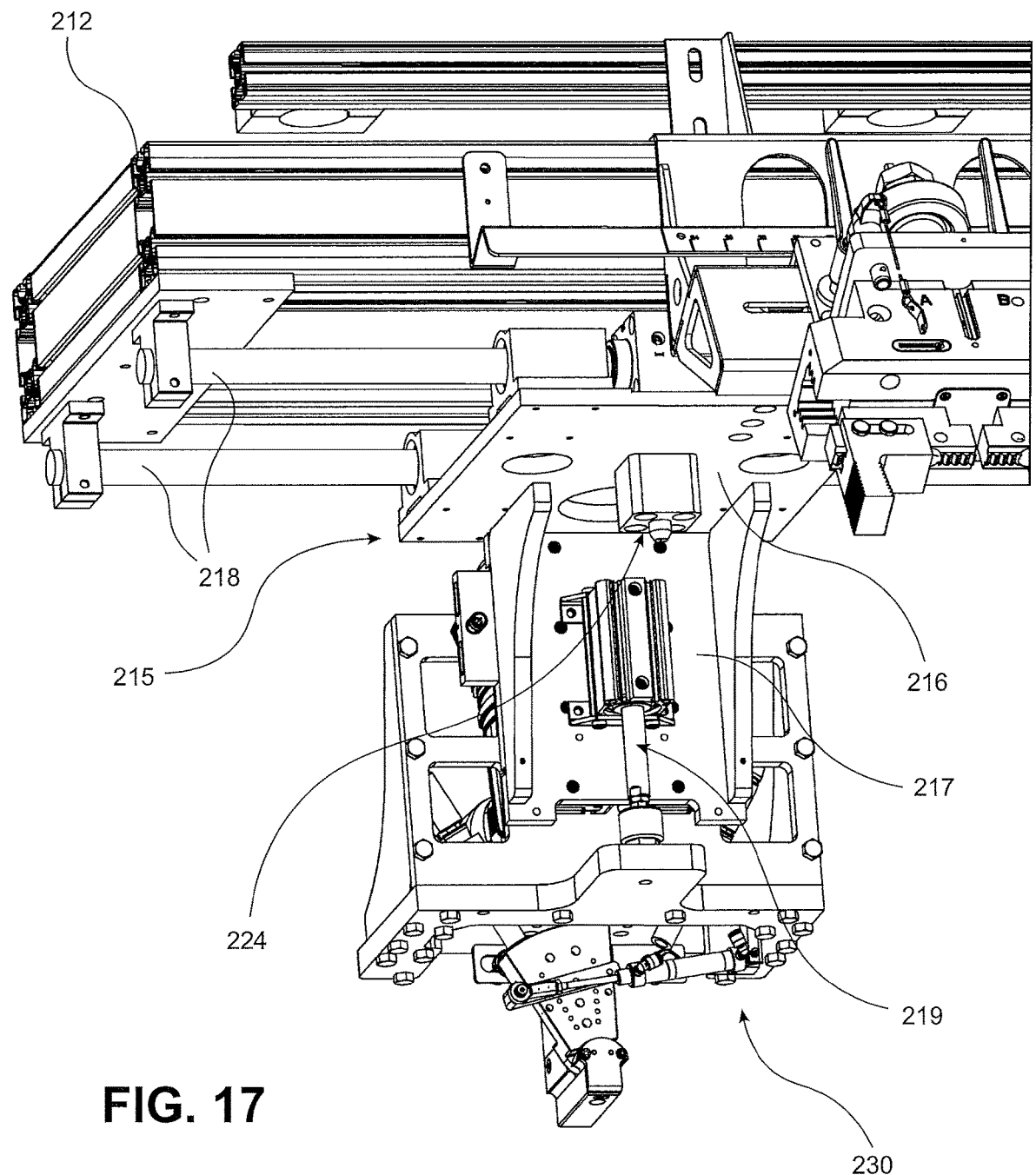
FIG. 17 is a fragmentary perspective view showing an underside of a portion of the end of arm tool of the manipulator.

FIG. 17 illustrates an underside of the frame assembly 212. Each of the outwardly disposed dispensers 230 is coupled to a support structure 215 including a support plate 216 and a perpendicularly arranged dispenser engagement portion 217. The support plate 216 is slidably disposed on a pair of support rails 218 coupled to the frame assembly 212 and extending parallel to the longitudinal direction thereof.

Figure 18:
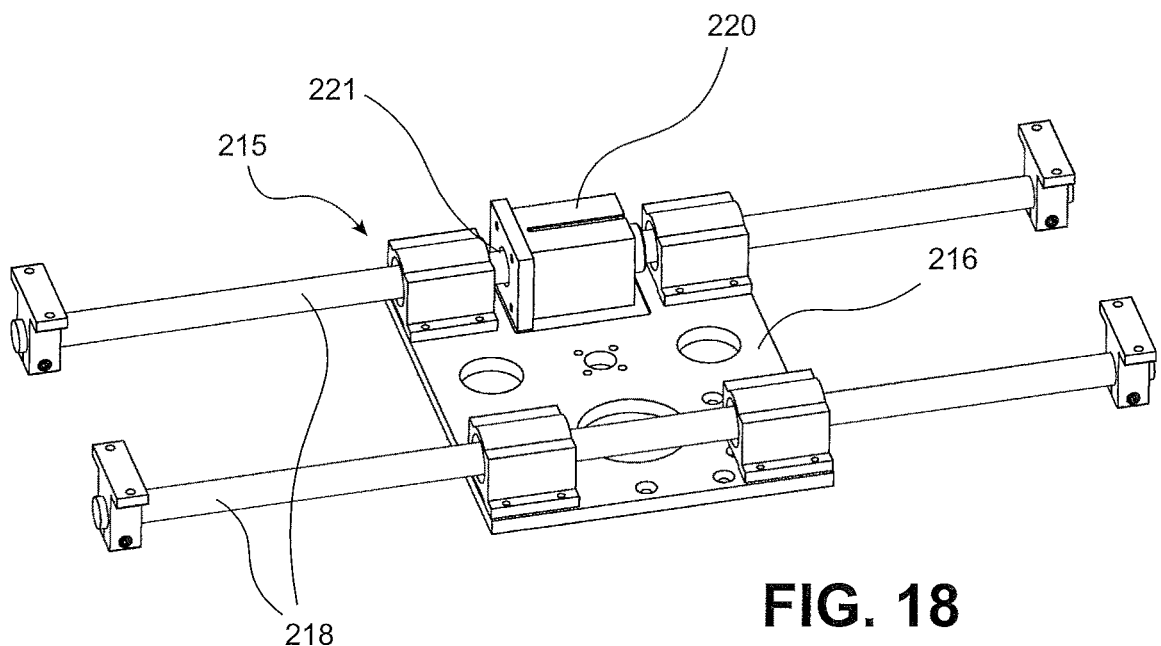
FIG. 18 is a perspective view showing a support structure of one of the dispensers in isolation.

FIG. 18 illustrates the support plate 216 and the support rails 218 in isolation, wherein a surface of the support plate 216 formed opposite the corresponding dispenser 230 is shown. A gripping mechanism 220 is securely coupled to the support plate 216 and includes an opening 221 receiving one of the support rails 218 therein. The gripping mechanism 220 is configured to selectively grip the outer surface of the one of the support rails 218 to secure a position of the dispenser 230 relative to the support rails 218. The gripping mechanism 220 may be a pneumatically actuated locking mechanism, as one non-limiting example.

Figure 19:
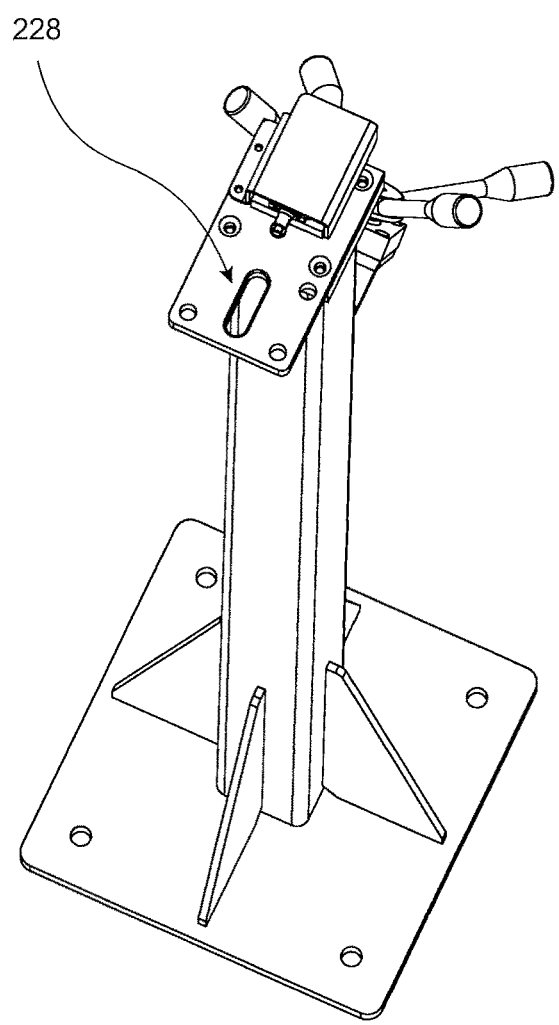
FIG. 19 is a perspective view of a keyhole structure.

Referring back to FIG. 17, a surface of the support plate 216 facing towards the dispenser 230 includes a key structure 224 disposed thereon. The key structure 224 includes a pattern of projections and/or openings having a specific configuration. Referring back to FIG. 12, a keyhole structure 228 is disposed adjacent the base of the manipulator 16. As shown in FIG. 19, which illustrates the keyhole structure 228 in isolation, the keyhole structure 228 includes a complimentary set of projections and/or opening configured to mate with the structure of the key structure 224 disposed on the support plate 216.

The use of the key structure 224 and the keyhole structure 228 allows for a position of each of the outwardly disposed dispensers 230 to be adjusted through use of the controller 12 and the robotic arm 200 rather than requiring a manual readjustment by an operator of the system 2. The controller 12 operating the robotic arm 200 is aware of the position and orientation of the EOAT 210. Using this information, the controller 12 can determine the exact position and orientation of each of the key structures 224. The controller 12 can thusly cause the robotic arm 200 to readjust the position and orientation of the EOAT 210 to position one of the key structures 224 in mating engagement with the keyhole structure 228, which is fixed in position. The controller 12 causes the gripping mechanism 220 to cease gripping the one of the support rails 218 to allow for a sliding of the support platform 216 relative to the frame assembly 212. The controller 12 then causes the EOAT 210 to translate in a direction parallel to the longitudinal direction of the support rails 218 to cause the support plate 216 to translate relative to the frame assembly 212 due to the newly fixed position of the support plate 216 relative to the stationary keyhole structure 228. The controller 12 then causes the gripping mechanism 220 to again grip the one of the support rails 218 to again fix the position of the support plate 216, and hence one of the outwardly disposed dispensers 230 coupled to the corresponding support plate 216. The same process can be repeated for the other of the outwardly disposed dispensers 230 to maintain an equal spacing between the centrally disposed dispenser 230 and each of the outwardly disposed dispensers 230. The adjustment of the positions of the outwardly disposed dispensers 230 aids in accommodating the formation of pallets of varying dimensions, as desired.

One of the grippers 280 is disposed towards the first end 213 of the frame assembly 212 while the other of the grippers 280 is disposed towards the second end 214 thereof. The grippers 280 are configured for grasping a workpiece associated with the system 2, such as one of the pallets disclosed herein. The grippers 280 may be standard gripping mechanisms as are known in the industry. For example, Schunk part number PGN-plus-200 grippers have been found to be suitable for use as the grippers 280. A position of each of the grippers 280 relative to the longitudinal direction of the frame assembly 212 may be adjusted via an adjustment mechanism 282 coupling each of the grippers 280 to the remainder of the frame assembly 212.

Figure 20:
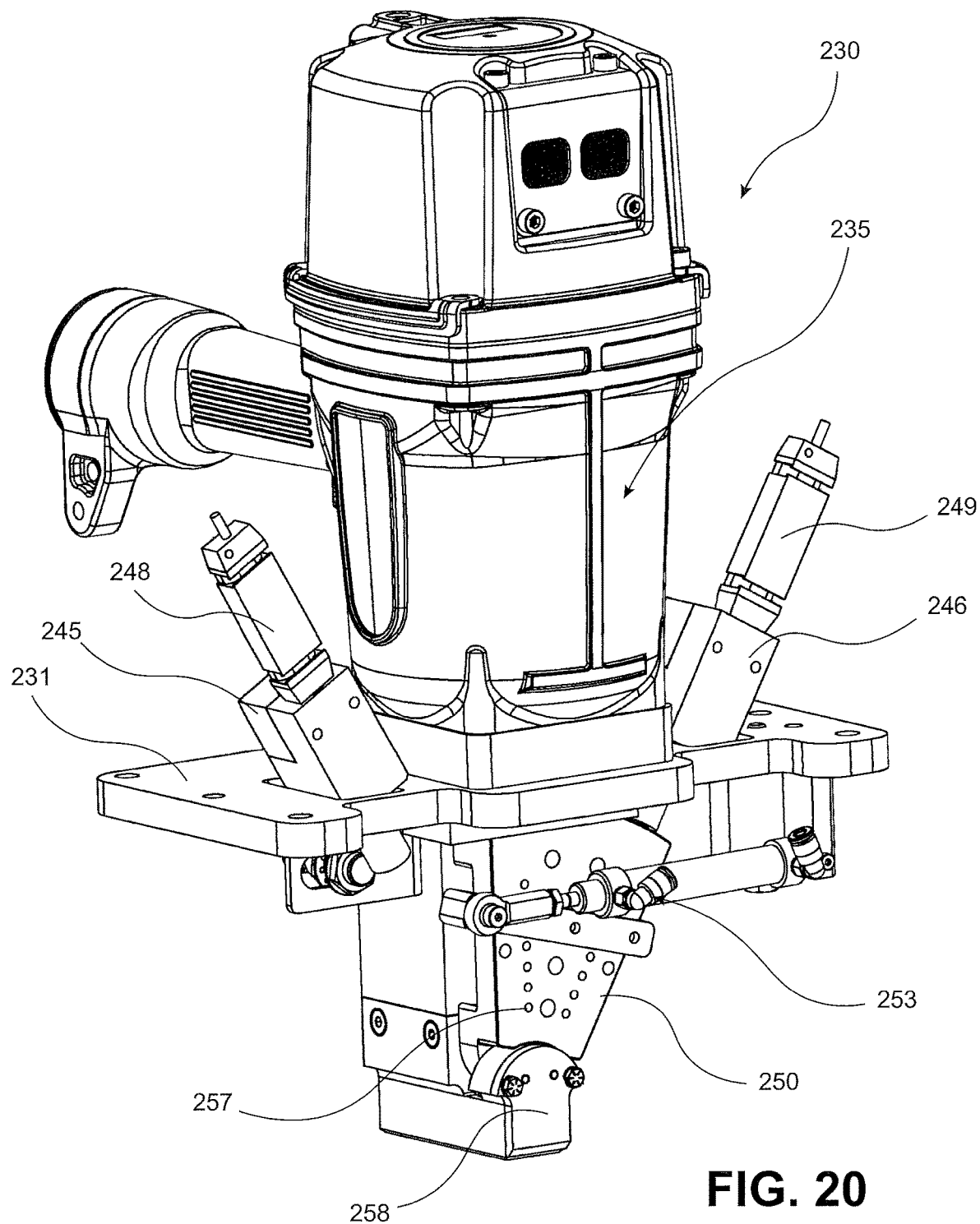
FIGS. 20 and 21 are perspective views showing one of the dispensers.
Figure 21:
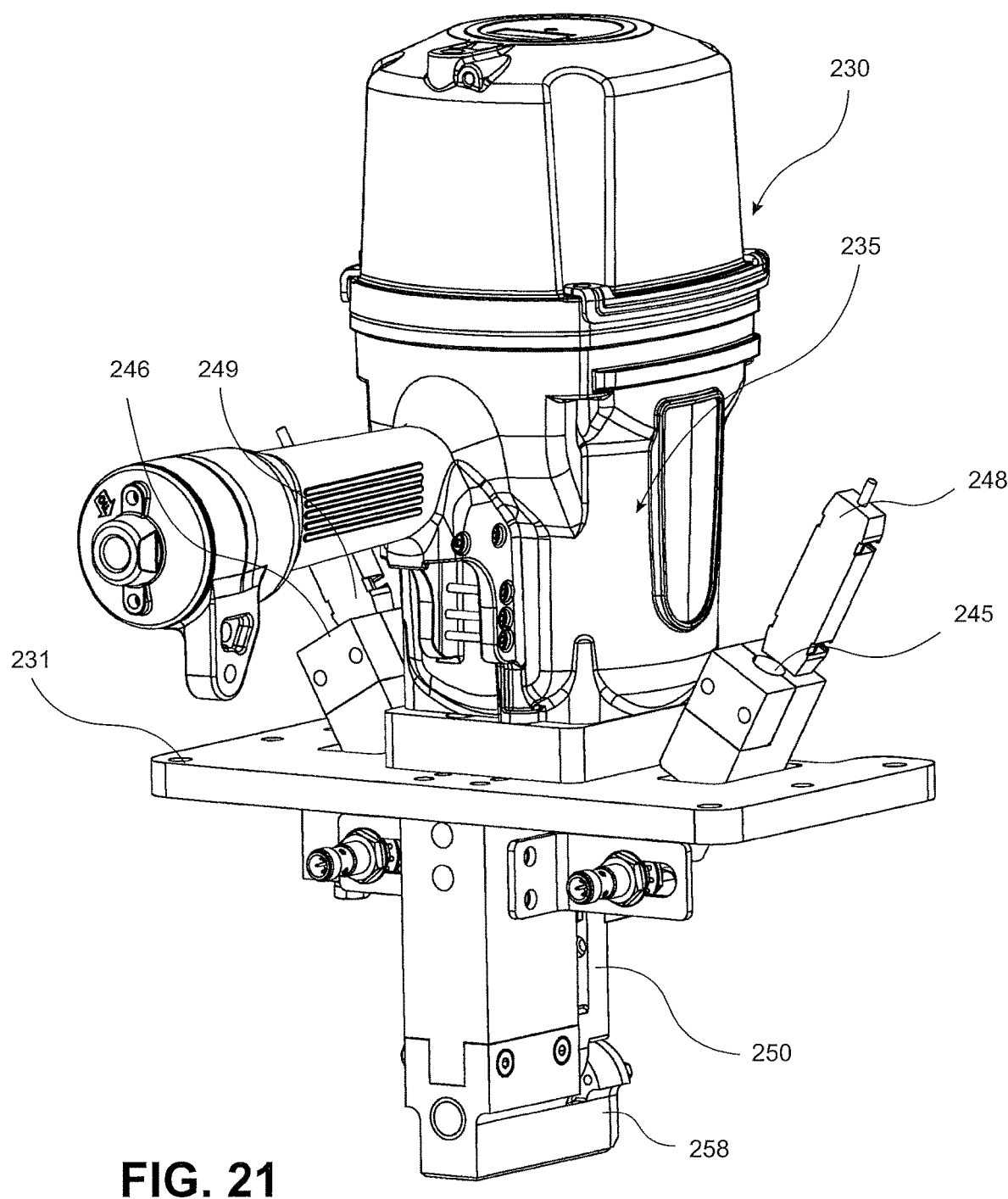

FIGS. 20 and 21 illustrate one of the dispensers 230 in isolation to better illustrate the features thereof. The dispenser 230 includes a frame element 231, a driving mechanism 235, a toggle block 250, a first inlet conduit 245, a second inlet conduit 246, and a dispensing head 258.

The first and second inlet conduits 245, 246 are fixed in position relative to the frame element 231. The first inlet conduit 245 is configured for coupling to an end of one of the second hose segments 95 while the second inlet conduit 246 is configured for coupling to an end of a second one of the second hose segments 95. The first and second inlet conduits 245, 246 each include cylindrical passageways for passing one of the fasteners therethrough. The first inlet conduit 245 is in fluid communication with the first fastener passageway 73 of one of the pressurization blocks 72 while the second inlet conduit 246 is in fluid communication with the second fastener passageway 74 of that same pressurization block 72. As such, the fasteners reach the first and second inlet conduits 245, 246 in alternating fashion in similar fashion to the manner in which the first and second fastener passageways 73, 74 of each of the pressurization blocks 72 receive the fasteners in alternating fashion. This relationship is further disclosed schematically via review of FIG. 33.

A first presence sensor 248 is disposed adjacent the first inlet conduit 245 and a second presence sensor 249 is disposed adjacent the second inlet conduit 246. Each of the presence sensors 248, 249 may be a ferrous material sensor, as described hereinabove with reference to the sensors 38, 87, 88. The presence sensors 248, 249 are configured to determine the presence of one of the fasteners passing thereby. Each of the presence sensors 248, 249 generates a signal that is communicated to the controller 12 to inform the controller 12 that one of the fasteners has reached the corresponding inlet conduit 245, 246. The controller 12 receives the signal and thusly determines the timing for ceasing the supply of the pressurized air to the pathway having delivered the corresponding fastener. In some circumstances, the controller 12 may cease the supply of the pressurized air immediately upon detection of one of the fasteners.

Figure 22:
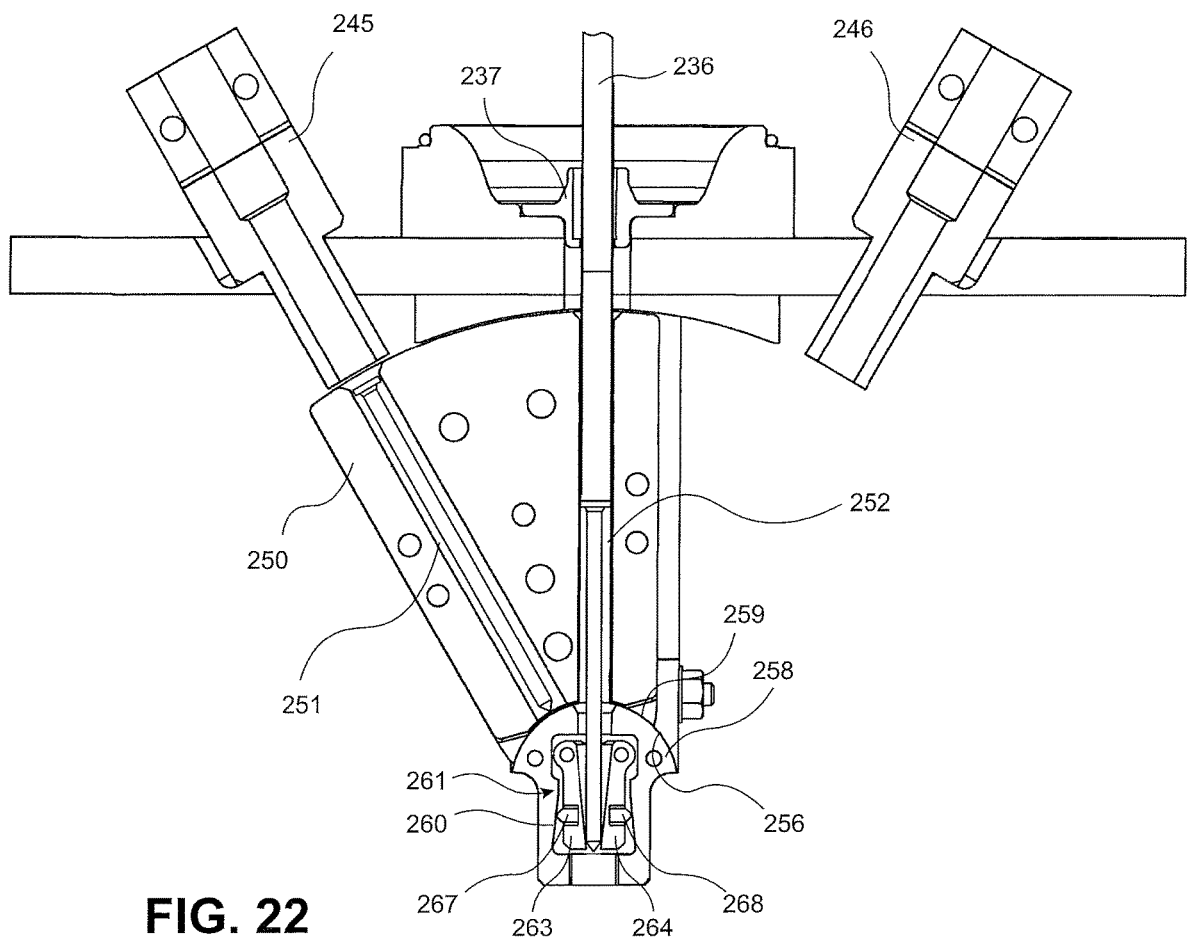
FIG. 22 is a cross-sectional view taken through one of the dispensers immediately prior to the driving of a fastener.
Figure 23:
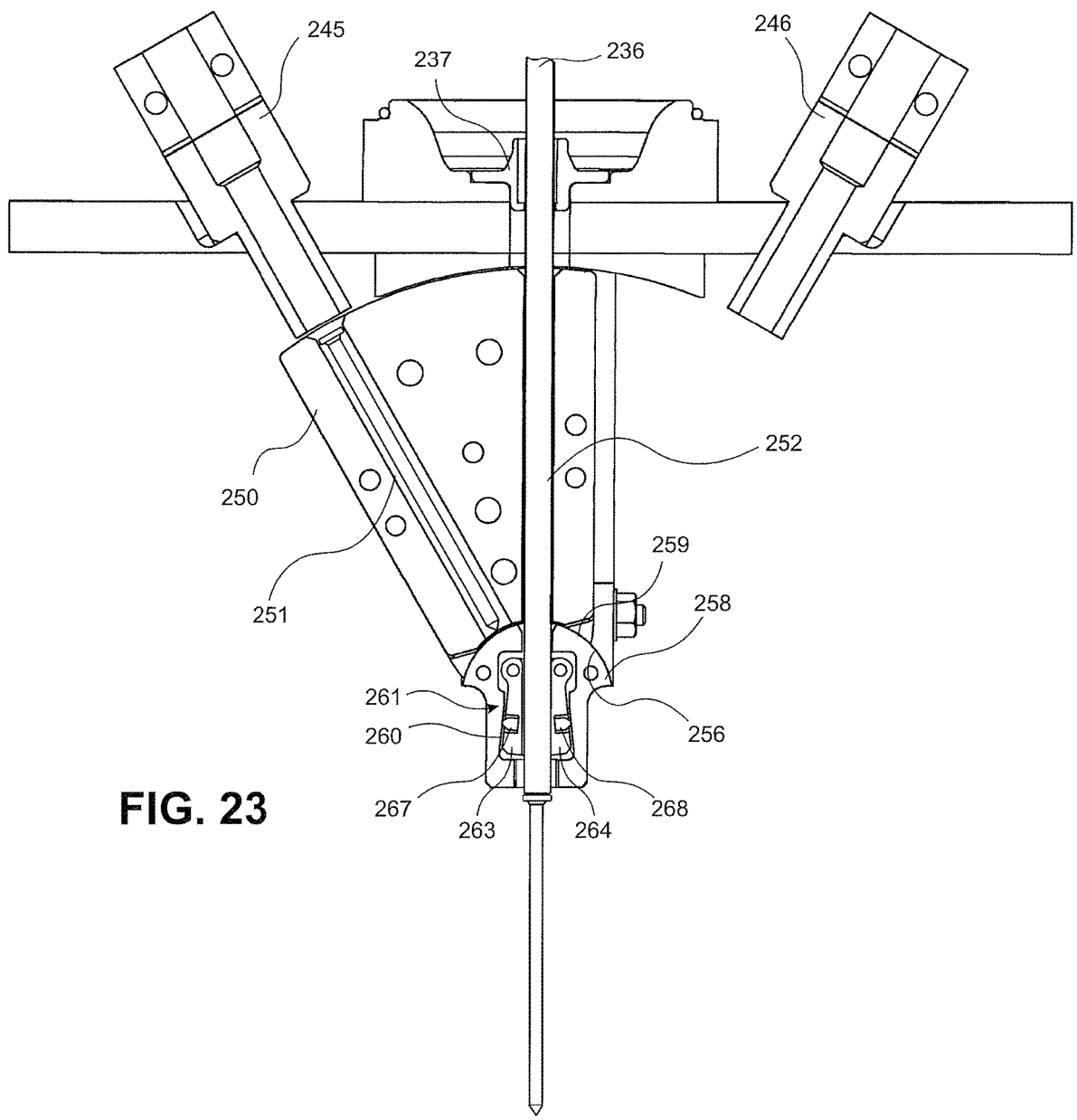
FIG. 23 is a cross-sectional view taken through one of the dispensers immediately after the driving of the fastener.

FIGS. 22 and 23 illustrate cross-sectional views of the first inlet conduit 245, the second inlet conduit 246, the toggle block 250, the dispensing head 258, and a portion of the driving mechanism 235 in isolation to better illustrate the relevant relationships therebetween.

The toggle block 250 includes a first fastener opening 251 and a transversely oriented second fastener opening 252, causing the fastener openings 251, 252 to form a V-shape. The first and second fastener openings 251, 252 are oriented to intersect at an axis of rotation of the toggle block 250 about which the toggle block 250 is configured to pivot. The first fastener opening 251 is configured for selective alignment with the first inlet conduit 245 for providing communication therebetween while the second fastener opening 252 is configured for selective alignment with the second inlet conduit 246 for providing communication therebetween. The toggle block 250 includes a plurality of vent openings 257 formed therein. Each of the vent openings 257 extends radially outwardly from one of the fastener openings 251, 252 to an outer surface of the toggle block 250. The vent openings 257 provide outlet pathways for the pressurized air reaching the toggle block 250 to prevent an incidence of back pressure preventing the passage of the fasteners through the second hose segments 95.

The driving mechanism 235 includes a piston 236 forming a hammer head for driving the fasteners out from the dispenser 230 and into the workpiece, such as one of the pallets. The piston 236 is actuated to slide axially and rapidly in a first direction towards one of the fasteners before being retracted axially in a second opposing direction away from the driven fastener. The piston 236 may be received in one or more cylindrical guides 237 constraining the piston 236 to slide exclusively in the axial direction thereof. The piston 236 may be driven by any mechanism suitable for actuating the piston 236 to reciprocate within the cylindrical guide or guides 237 in a manner suitable for driving one of the fasteners into a workpiece. The piston 236 may be driven by a mechanism converting rotary motion to the linear motion of the piston 236. The piston 236 may alternatively be actuated by pneumatic forces, hydraulic forces, or magnetic forces acting on the piston 236, so long as the piston 236 is accelerated to an extent suitable for the driving of the fasteners into the desired workpiece.

As best shown in FIG. 20, an actuator mechanism 253 having ends coupled to each of the toggle block 250 and the frame element 231 is configured for pivoting the toggle block 250 about the axis of rotation thereof. The toggle block 250 is pivotable between a first position wherein the first fastener opening 251 is aligned with the first inlet conduit 245 while the second fastener opening 252 is aligned with the piston 236 and a second position wherein the second fastener opening 252 is aligned with the second inlet conduit 246 while the first fastener opening 251 is aligned with the piston 236.

The dispensing head 258 includes an outer surface 259 having the shape of a segment of a circle. An inner end face 256 of the toggle block 250 has a corresponding shape of a segment of a circle to allow the toggle block 250 to pivot about the outer surface 259 of the dispensing head 258. As best shown in FIGS. 22 and 23, the outer surface 259 also forms a resting surface for one of the fasteners disposed within the one of the fastener openings 251, 252 not instantaneously aligned with the piston 236.

The dispensing head 258 includes an opening 260 extending therethrough in a direction parallel to the axial direction of the piston 236. The opening 260 includes a minimum inner diameter equal to or slightly greater than an outer diameter of the piston 236. A fastener alignment mechanism 261 is disposed within an enlarged portion of the opening 260 of the dispensing head 258.

The fastener alignment mechanism 261 includes a first alignment finger 263 and a second alignment finger 264. The first and second alignment fingers 263, 264 are formed at diametrically opposing sides of the path of the piston 236 when the piston 236 is extracted to a position between the alignment fingers 263, 264. The first alignment finger 263 pivots about a first axis of rotation disposed to a first side of the path of the piston 236 while the second alignment finger 264 pivots about a second axis of rotation disposed to a second side of the path of the piston 236. A first spring element 267 is disposed between a portion of the first alignment finger 263 spaced from the first axis of rotation and a first side of an inner surface of the dispensing head 258 defining the opening 260. A second spring element 268 is disposed between a portion of the second alignment finger 264 spaced from the second axis of rotation and a second opposing side of the inner surface of the dispensing head 258. The first and second spring elements 267, 268 are configured to normally urge the first and second alignment fingers 263, 264 against each other along a center of the path of the piston 236.

Figure 26:
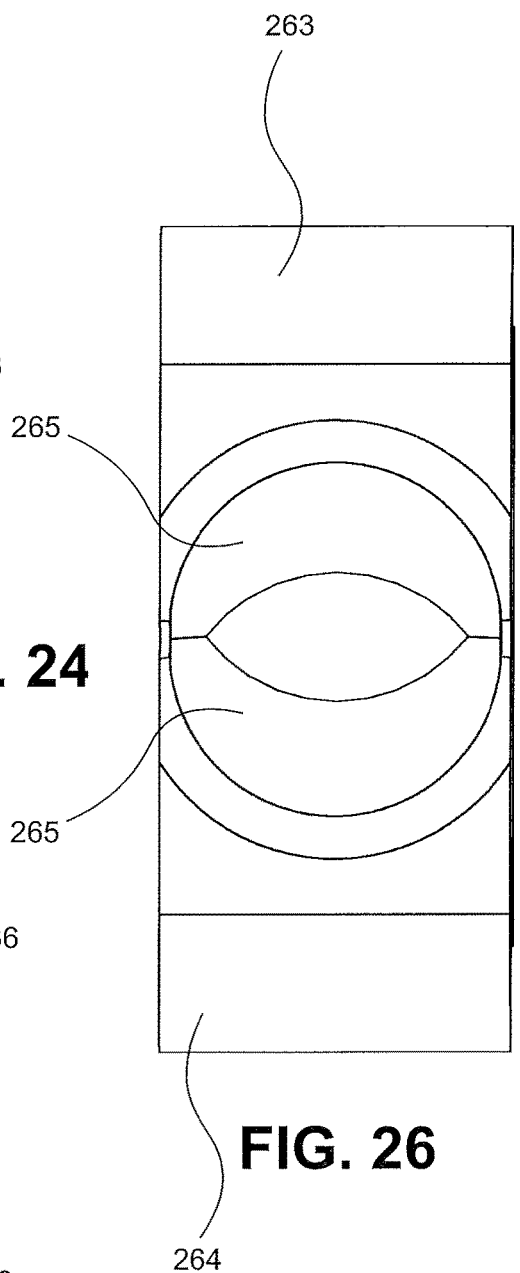
FIG. 26 is a top plan view of a pair of alignment fingers forming the alignment feature of the dispenser.

As best shown in FIG. 26, which illustrates the alignment fingers 263, 264 from the perspective of the end face of the piston 236, the alignment fingers 263, 264 each include symmetrically formed conical surfaces 265 that taper inwardly as the alignment fingers 263, 264 extend away from the respective axes of rotation thereof. The shape of the conical surfaces 265 aids in securing an orientation of one of the fasteners when the fastener is received within the opening 260 of the dispensing head 258 as explained hereinafter.

FIG. 22 illustrates the dispenser 230 immediately prior to the driving of one of the fasteners originating from the second inlet conduit 246 and disposed partially within each of the second fastener opening 252 of the toggle block 250 and the opening 260 of the dispensing head 258. Another one of the fasteners originating from the first inlet conduit 245 is disposed within the first fastener opening 251 of the toggle block while resting against the outer surface 259 of the dispensing head 258 while awaiting entry into the opening 260 upon a pivoting of the toggle block 250. The piston 236 is retracted to a position wherein a pivoting of the toggle block 250 does not interfere with the piston 236.

The fastener disposed within the opening 260 includes the pointed end thereof obstructed by the cooperating alignment fingers 263, 264 of the alignment mechanism 261 in a manner causing the fastener to rest at an end of each of the conical surfaces 265 of the alignment fingers 263, 264 opposite the axes of rotation thereof. The head of the fastener is received within the second fastener opening 252 with a relatively small clearance to ensure a desired orientation of the fastener when dispensed from the dispensing head 258.

As the piston 236 is accelerated to contact and initially drive the fastener, the fastener pushes the opposing alignment fingers 263, 264 apart while the alignment fingers 263, 264 pivot away from the fastener against the urging of each of the opposing spring elements 267, 268. The pivoting of the alignment fingers 263, 264 progressively widens a spacing formed therebetween to allow the fastener to pass between the alignment fingers 263, 264 while the spring elements 267, 268 continuously ensure the orientation of the fastener by maintaining equal and opposing inwardly extending forces on the fastener through the alignment fingers 263, 264.

FIG. 23 shows the dispenser 230 immediately after the piston 236 has been fully extracted to drive the fastener out of the dispensing head 258. The alignment fingers 263, 264 are spaced from each other and dimensioned in a manner wherein the piston 236 has a relatively small clearance when passing between the conical surfaces of the cooperating alignment fingers 263, 264 when the alignment fingers 263, 264 are pivoted to a maximum extent away from the piston 236.

Figure 24:
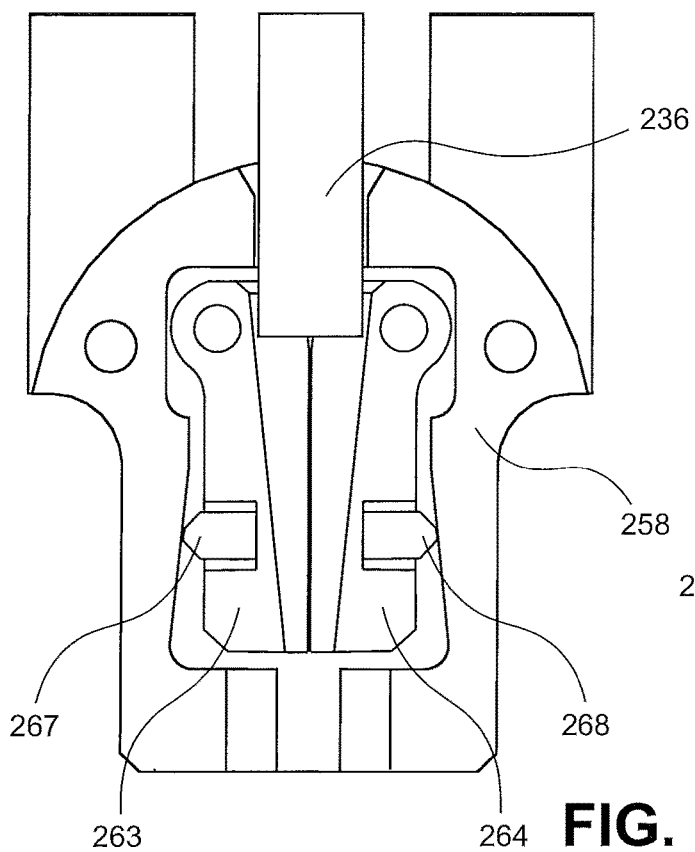
FIG. 24 is a cross-sectional view taken through one of the heads of the dispenser prior to a piston of the dispenser encountering an alignment feature of the dispenser.
Figure 25:
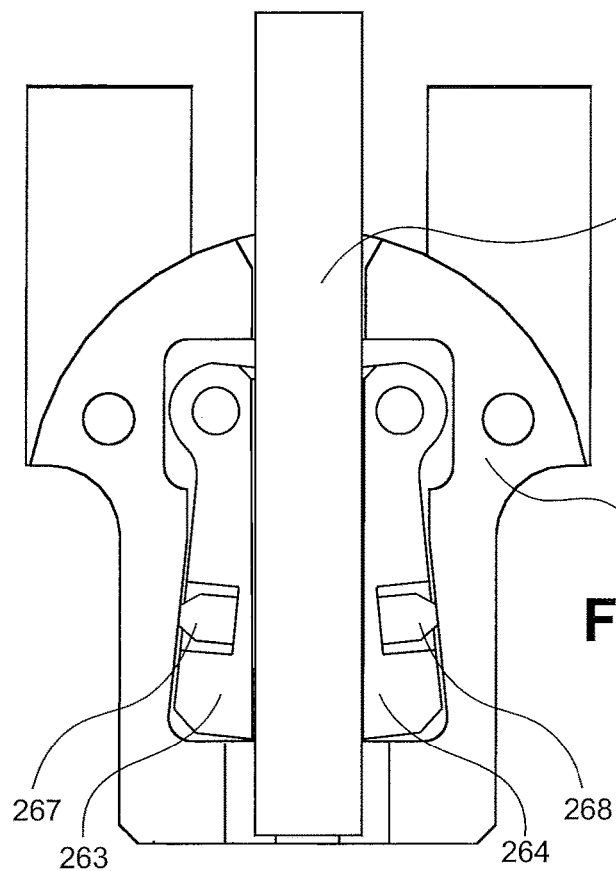
FIG. 25 is a cross-sectional view taken through one of the heads of the dispenser immediately after the piston has encountered the alignment feature of the dispenser.

FIGS. 24 and 25 show cross-sectional views of the dispensing head 258 and the piston 236 in isolation. As best shown in FIG. 24, the alignment fingers 263, 264 may be maintained in a position suitable for grasping one of the fasteners until the piston 236 reaches a position adjacent the axes of rotation of the alignment fingers 263, 264. As shown in FIG. 25, the alignment fingers 263, 264 separate rapidly when first encountered by the piston 236 to ensure that the orientation of the fastener is maintained by the grasping of the alignment fingers 263, 264 for as long as possible. The alignment fingers 263, 264 accordingly ensure a straight driving of the fasteners to eliminate the incidence of misaligned fasteners originating from the dispenser 230.

It should also be understood that the structure of each of the dispensers 230 may be modified while remaining within the scope of the present invention. For example, the toggle block 250 may be modified to include alternative structural relationships for receiving the fasteners from multiple different pathways as described herein. For example, the toggle block 250 may be adapted to oscillate linearly in a back-and-forth motion to alternatingly place the corresponding fastener openings 251, 252 into alignment with the piston 236 or one of the inlet conduits 245, 246.

Referring back to FIG. 17, the frame element 231 of each of the outwardly disposed dispensers 230 is slidably engaged with the dispenser engagement portion 217 of a corresponding one of the support structures 215. The sliding engagement may be formed by cooperating rail structures present on each of the frame element 231 and the dispenser engagement portion 217, but any sliding joint may be used. The sliding between the support structure 215 and the frame element 231 occurs in a direction parallel to the axial direction of the piston 236 used to drive the fasteners. The centrally disposed dispenser 230 also includes a sliding engagement between the frame element 231 thereof and a portion of the frame assembly 212 extending adjacent the frame element 231, as can be seen in FIG. 16. The sliding between the centrally disposed frame element 231 and the frame assembly 212 is also parallel to the axial direction of the piston 236.

A spring mechanism 219 provides a spring force between each of the support structures 215 and the frame element 231 of each of the outwardly disposed dispensers 230. One of the spring mechanisms 219 also provides a spring force between the frame element 231 of the centrally disposed dispenser 230 and the frame assembly 212. Each of the spring mechanisms 219 may be a pneumatic spring that exerts an increased pneumatic force in reaction to the spring mechanism 219 being compressed. As such, the spring mechanisms 219 are configured to oppose motion between a corresponding one of the dispensers 230 and the frame assembly 212 of the EOAT 210. The spring mechanisms 219 may all be arranged parallel to the axial direction of the piston 236 in similar fashion to the direction of sliding of each of the dispensers 230 relative to the frame assembly 212.

Because the support structures 215 are normally fixed in position relative to the frame assembly 212 during use of the system 2, the spring mechanisms 219 are described hereinafter as providing a spring force between the frame assembly 212 and a corresponding one of the dispensers 230, as each of the fixed support structures 215 is considered a portion of the frame assembly 212 when secured in position thereto.

The spring mechanisms 219 are configured to aid the dispensers 230 in driving the fasteners into a workpiece having an inconsistent outer surface. For example, pallets are often formed from wood that has various portions with an increased dimension or a decreased dimension due to warping, damage, knots, or the like. The spring mechanisms 219 aid the three dispensers 230 in simultaneously delivering three of the fasteners into the associated workpiece without over-driving or under-driving any of the fasteners, regardless of inconsistencies present in the workpiece.

FIGS. 27-30 show the manner of operation of each of the spring mechanisms 219 schematically, wherein each of the spring mechanisms 219 is represented as a spring structure disposed between the frame assembly 212 of the EOAT 210 and the dispensing head 258 of each of the dispensers 230.

A workpiece 290 includes various portions of different heights due to inconsistencies in the outwardly exposed surface of the workpiece 290. A dashed line extends through the workpiece and represents a benchmark that the dispensing head 258 of each of the dispensers 230 is programmed to attempt to reach when approaching the workpiece 290 in a direction parallel to the axial direction of the piston 236. The benchmark is preprogrammed into the controller 12 to account for expected variations in the dimensions of the workpiece 290, and especially for determining the smallest possible height expected. The workpiece 290 is shown in FIGS. 27-30 as having a portion with a height almost thin enough to reach the programmed benchmark, but it is understood that the benchmark may be selected to be a greater distance from the thinnest portion of the workpiece 290, as desired.

Figure 27:
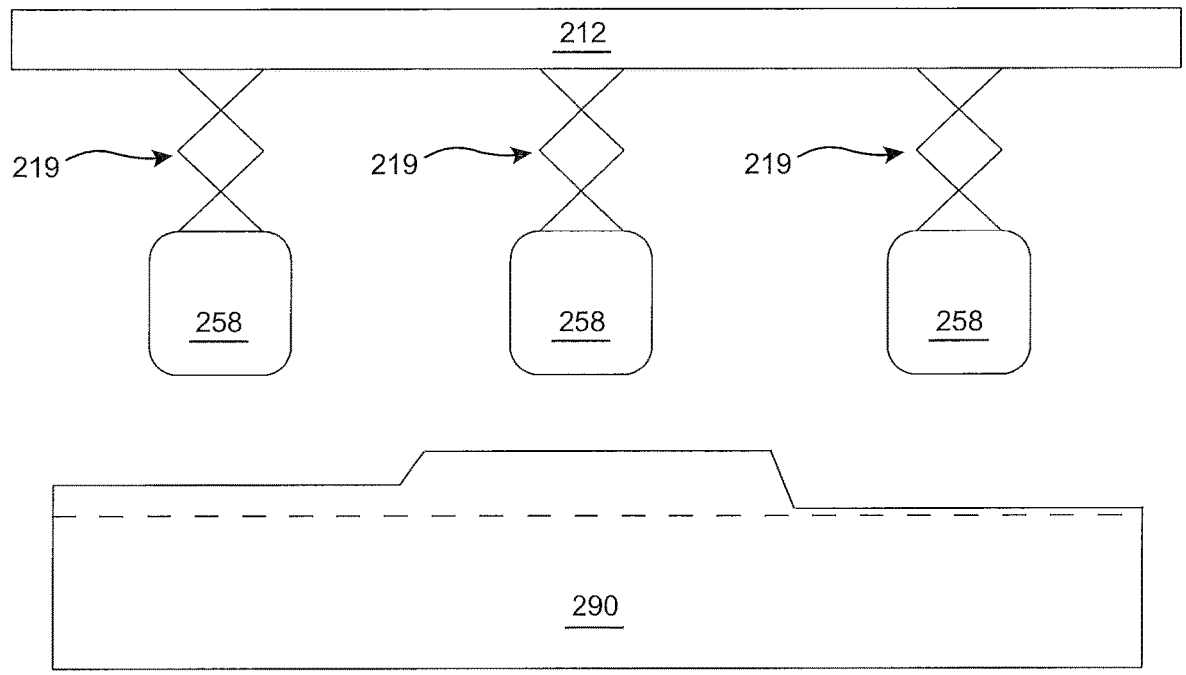
FIGS. 27-30 are schematic representations of a method of operation of a plurality of spring mechanisms associated with the dispensers of the manipulator.
Figure 28:
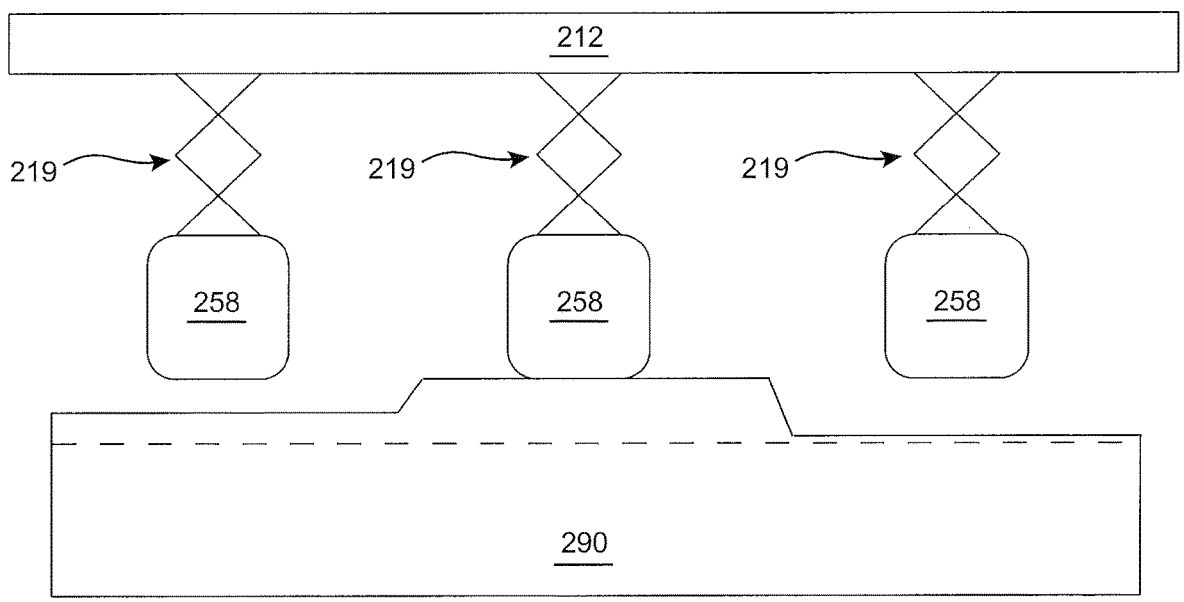
Figure 29:
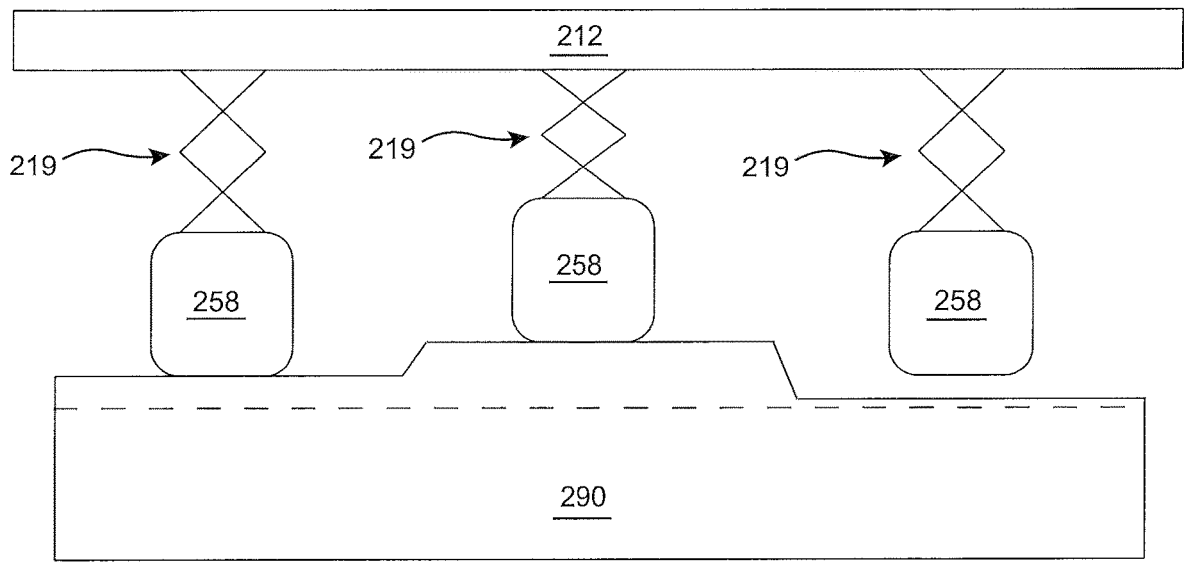

In FIG. 27, all of the dispensing heads 258 are spaced from the workpiece 290. FIG. 28 illustrates the frame assembly 212 as having approached the workpiece 290 until the centrally disposed dispenser 230 first encounters the thickest portion of the workpiece 290. None of the spring mechanisms 219 has been compressed at this point. However, FIG. 29 shows the frame assembly 212 as having approached the workpiece 290 to an extent that two of the dispensing heads 258 are in contact with the workpiece 290, which has resulted in the centrally disposed spring mechanism 219 having been partially compressed as a result of the corresponding dispensing head 258 having slid closer to the frame assembly 212 against the urging of the centrally disposed spring mechanism 219.

Figure 30:
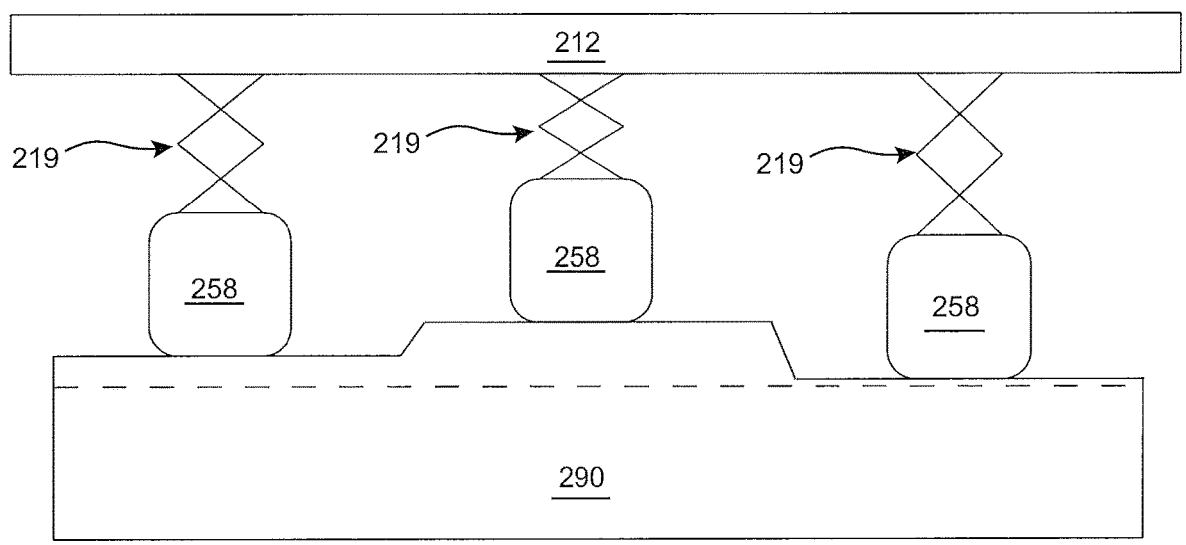

FIG. 30 shows the frame assembly 212 as having been moved to a position wherein each of the dispensing heads 258 would have reached the benchmark in the absence of the presence of the workpiece 290. The centrally disposed spring mechanism 219 is compressed to the greatest extent, the leftmost spring mechanism 219 is partially compressed to an extent less than the centrally disposed spring mechanism 219, and the rightmost disposed spring mechanism 219 is only slightly compressed to an extent less than the leftmost spring mechanism 219. The compression of each of the spring mechanisms 219 ensures that each of the dispensing heads 258 maintains pressure against the workpiece 290 as the frame assembly 212 is moved towards the workpiece 290 and the benchmark position. The compression of each of the spring mechanisms 219 also allows for each of the dispensers 230 to translate in the direction of motion of the frame assembly 212 towards the workpiece 290, thereby allowing the frame assembly 212 to continue moving towards the workpiece 290 even after one of the dispensing heads 258 has made contact with a portion of the workpiece.

Once the frame assembly 212 has reached the benchmark position, each of the dispensing heads 258 is then ready to expel one of the fasteners. The maintaining of each of the dispensing heads 258 directly on the outer surface of the workpiece 290 as the frame assembly 212 continues its motion towards the workpiece 290 accordingly ensures that none of the fasteners is driven too far into the workpiece 290. The preprogrammed motion of the frame assembly 212 to a benchmark position beyond the expected surface of the workpiece 290 also ensures that none of the fasteners is under driven into the workpiece 290 wherein the head of the fastener is spaced from the outer surface of the workpiece 290.

Figure 31:
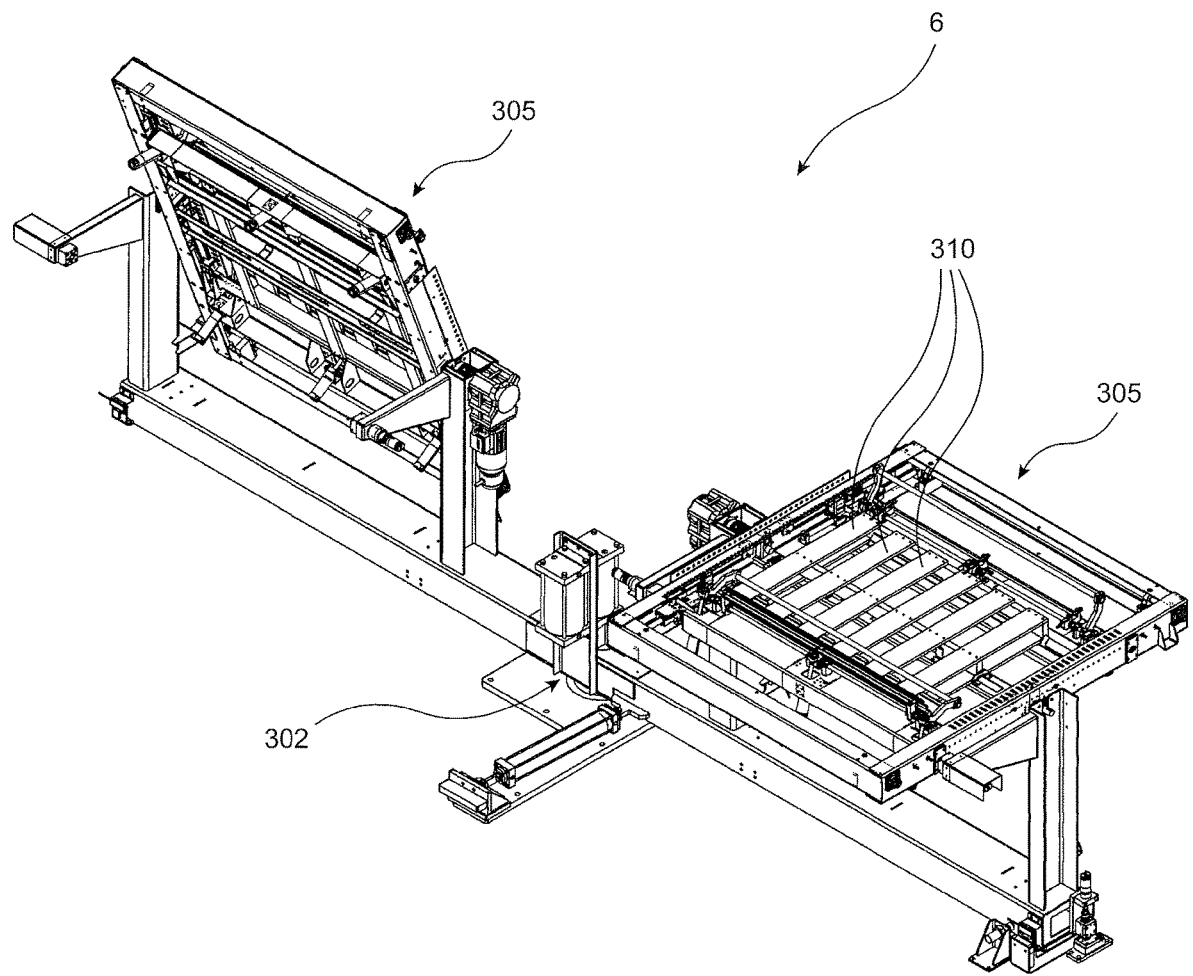
FIG. 31 is a perspective view of a fixture assembly of the pallet assembly system.
Figure 32:
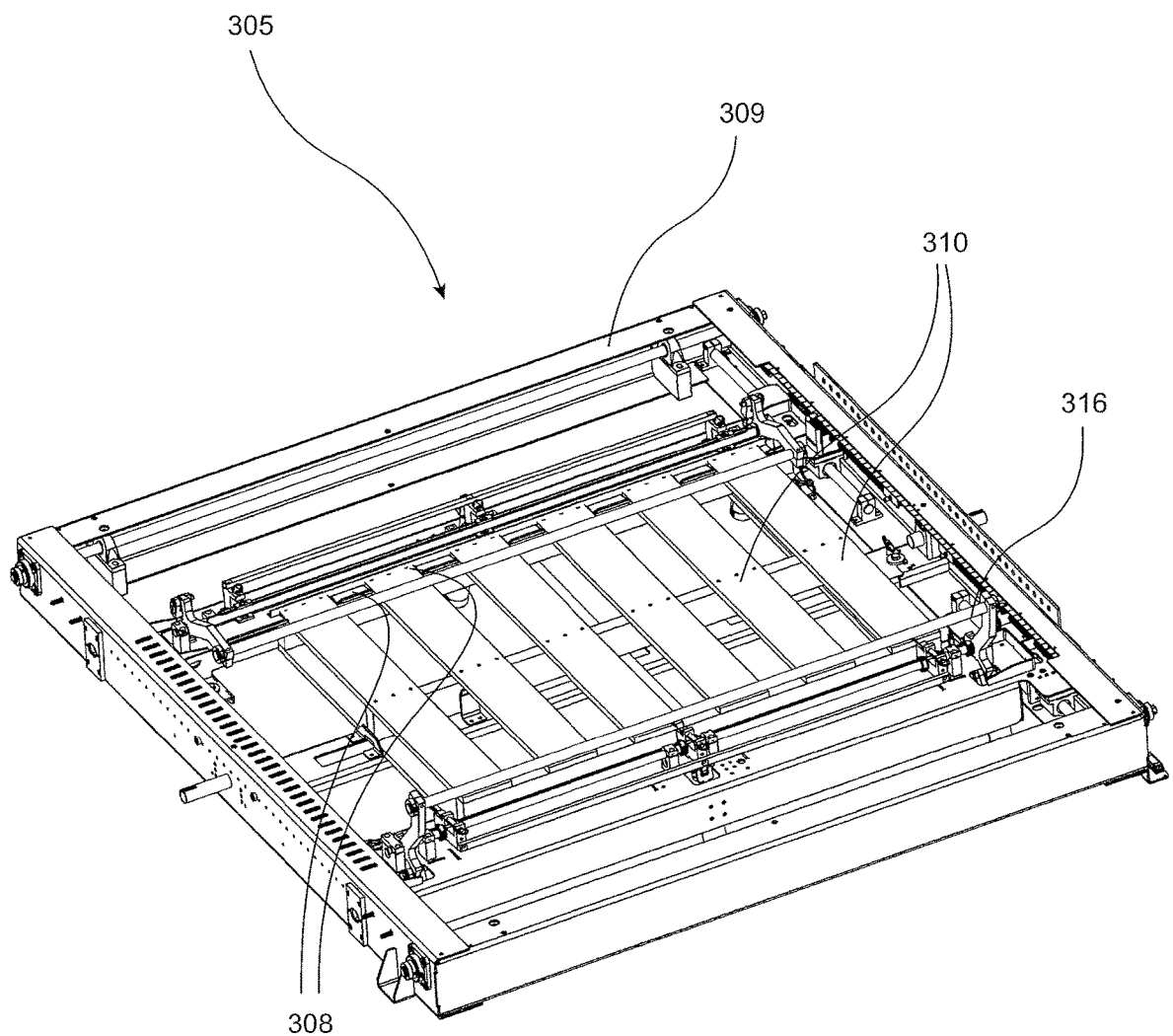
FIG. 32 is a perspective view of a pallet fixture of the fixture assembly.

As shown in FIGS. 31 and 32, the fixture assembly 6 includes a rotatable base portion 302 having a pair of pallet fixtures 305 disposed on opposing ends thereof, wherein the fixture assembly 6 is configured to alternate each of the pallet fixtures 305 between a loading position and an assembly position, as discussed further below. The base portion 302 is configured to rotate about a central and vertically arranged axis of rotation. Each of the pallet fixtures 305 is rotatably coupled between a pair of uprights of the base portion 302. In the illustrated embodiment, each of the pallet fixtures 305 is rotatable between a horizontal orientation and an upright orientation by rotation of the corresponding pallet fixture 305 about a horizontally extending axis of rotation perpendicular to the axis of rotation of the base portion 302.

Generally, the pallet fixtures 305 are configured to receive a plurality of pallet boards 310 comprising a plurality of layers of each of the pallets, wherein the boards 310 may include top deck boards, stringers, and bottom deck boards, as one non-limiting example. As shown in FIG. 32, the pallet fixtures 305 may be configured to accommodate various sizes of pallet boards 310 by incorporating interchangeable guides 308 and locking mechanisms 316. The guides 308 refer to any structures of the pallet fixture 305 configured for providing the relative positioning of each of the pallet boards 310 forming the resulting pallet. For example, the pallet fixture 305 shown in FIG. 32 includes equally spaced apart tabs forming openings therebetween for receiving a layer of the pallet boards 310 at equally spaced intervals. The locking mechanisms 316 refer to any mechanisms suitable for locking a layer of the pallet boards 310 in position after having been positioned using any of the guides 308. The locking mechanisms 316 may include various clamps, latches, and the like for gripping the pallet boards 310 when another layer of the pallet boards 310 is being applied to the pallet fixture 305.

For example, the pallet fixture 305 may include guides 308 that are adjustably coupled to a frame 309 of the pallet fixture 305, wherein a spacing of the pallet boards 310 can be adjusted by securing the guides 308 in a desired position. In the illustrated embodiment, the frame 309 of the pallet fixture 305 includes a plurality of slots formed therein, wherein each of the slots is configured to receive a corresponding tab of one of the pallet boards 310. The pallet fixture 305 shown in FIG. 32 may further include guides that are removably coupled to the frame 309 of the pallet fixture 305 to more easily accommodate pallets of varying dimensions and configurations.

As one non-limiting example, the pallet fixture 305 may include guides 308 and locking mechanisms 316 suitable for forming three independent layers of boards on the pallet fixture 305. A first layer may form one outermost layer, a second layer may form an intermediate layer, and a third layer may form another outermost layer. The first and third layers may be formed by pallet boards extending in parallel while the second layer is formed from pallet boards 310 extending perpendicular to the first and third layers. After an operator places the pallet boards 310 for each layer in positions specified by the guides 308, the locking mechanism 316 corresponding to that layer may be actuated to lock that layer of the pallet boards 310 in place. This process is repeated until a desired configuration of the pallet boards 310 is coupled to the pallet fixture 305 in a desired configuration.

Figure 2:
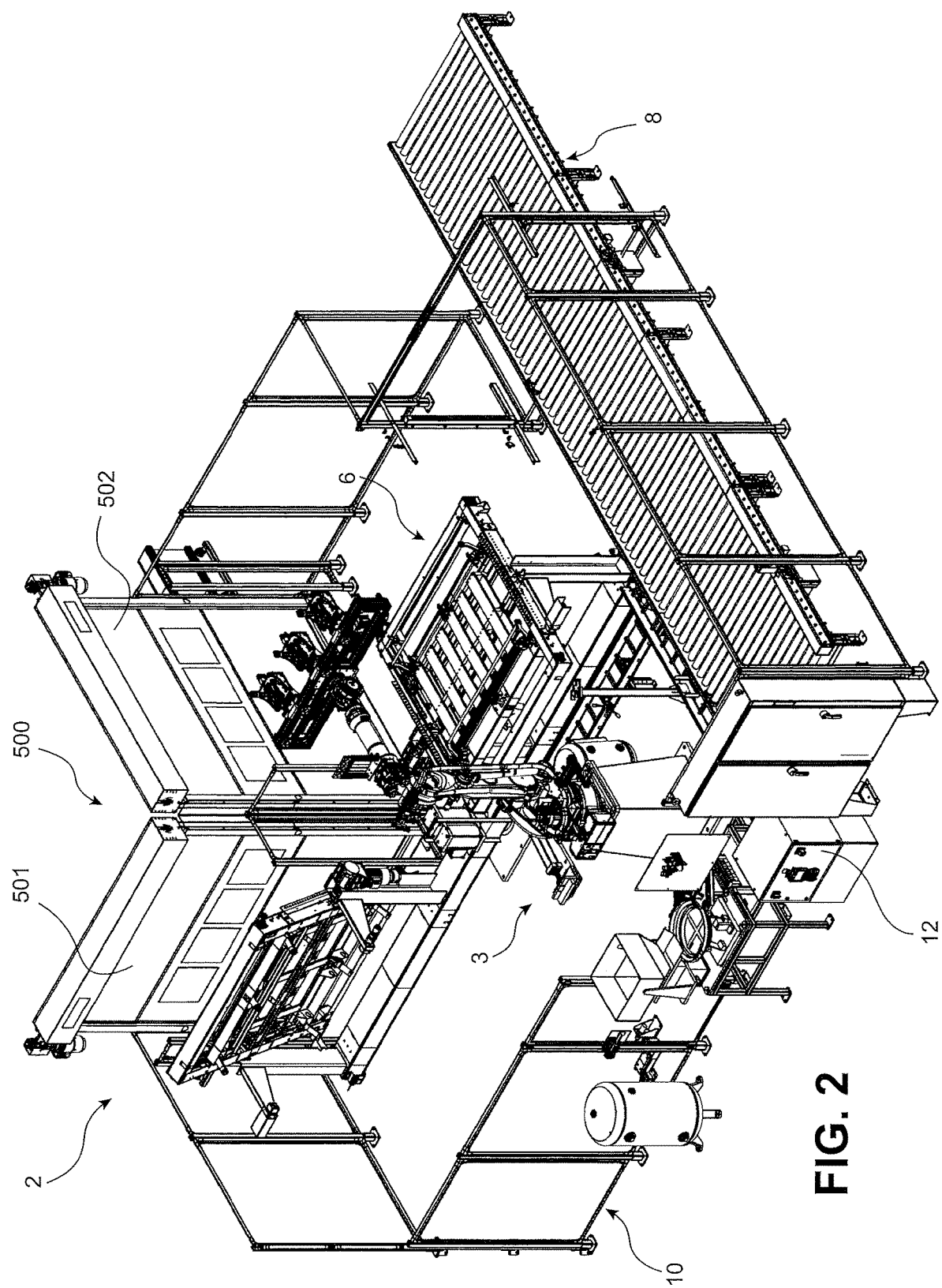

As shown in FIGS. 1 and 2, the unloading system 8 comprises a plurality of conveyors configured to receive and transport one or more stacks of the assembled pallets from the pallet assembly system 2. Although line-shaft conveyors are shown in the illustrated embodiment, other means of conveying assembled pallets will be appreciated by those skilled in the art.

The enclosure 10 of the pallet assembly system 2 substantially encompasses the fixture assembly 6, the unloading system 8, and the manipulator 16, while allowing continuous access to the feeder 18 of the fastener delivery system 14.

The enclosure 10 further includes a loading station 500. The loading station 500 is defined by a first door 501 and a second door 502 arranged perpendicular to each other. In the illustrated embodiment, retractable roll-top doors are used to selectively isolate the loading station 500 from an interior of the enclosure 10, wherein the pallet fixtures 305 can be accessed through either one of the first door 501 or the second door 502, depending on the positioning of the pallet fixtures 305.

As shown with renewed reference to FIGS. 1 and 2, the fixture assembly 6 is rotatable between a first position and a second position. The first position includes a first one of the pallet fixtures 305 positioned in the loading position at the loading station 500 while the oppositely arranged second one of the pallet fixtures 305 is positioned in the assembly position adjacent the manipulator 16. The loading position includes each of the pallet fixtures 305 oriented vertically to present a face of the pallet fixture 305 to the operator for loading. When in the assembly position, each of the pallet fixtures 305 is oriented horizontally to position the pallet boards 310 for receiving the fasteners from the dispensers 230. The second position includes the entirety of the fixture assembly 6 rotating 90 degrees about the vertically arranged rotational axis to place the first one of the pallet fixtures 305 adjacent the loading station 500 while the second one of the pallet fixtures 305 is placed adjacent the manipulator 16.

One skilled in the art should appreciate that the system 2 may be modified in various respects while remaining within the scope of the present invention. For example, the number of various components may be increased or decreased to accommodate applications requiring more of less of the fasteners simultaneously.

In use, the operator provides a supply of the fasteners into the feeder 18. The feeder 18 sorts the fasteners into a single file line that is fed to the feed track 122 of the distributor 20. The switch tracks 123, 124 of the distributor 20 distribute the fasteners between the three distribution tracks 125, 126, 127 thereof after the fasteners exit the feed track 122. The plunger valves 138 control a position of the fasteners relative to the picks blocks 52 moving cyclically relative to the distribution tracks 125, 126, 127. Each cycle of the pick blocks 52 causes one of the fasteners to enter the conical aperture 63 present in each of the funnel blocks 62. The sets of three fasteners are alternatingly provided to the first fastener passageways 73 and the second fastener passageways 74 formed in each of the pressurization blocks 72 due to the cyclical translation of the pressurization blocks 72 and the sensor blocks 82 in the lateral direction.

Each of the fasteners subsequently falls through one of the presence sensors 87, 88 associated with one of the sensor blocks 82. Each of the presence sensors 87, 88 determines when one of the fasteners has passed thereby and generates a control signal to the controller 12. As explained herein and best illustrated by FIG. 33, all three of the presence sensors 87 or the presence sensors 88 should detect one of the fasteners substantially simultaneously due to system 2 alternating the distribution of the fasteners between the two alternating pathways formed through each of the outlet assemblies 50.

Each of the fasteners enters one of the first hose segments 90 while being sensed by one of the presence sensors 87, 88. The controller 12 in turn sends a control signal to each corresponding valve 155 to indicate that the source of pressurized air 150 should be placed in fluid communication with the corresponding first hose segment 90. The pressurized air flows through each of the first hose segments 90 having one of the fasteners to accelerate each of the fasteners towards a corresponding one of the air brake mechanisms 170. One of the air brake mechanisms 170 is encountered by each of the fasteners. Each of the air brake mechanisms 170 outlets a quantity of the pressurized air through the escape openings 173 thereof. The pressurized air accordingly has a decreased pressure when exiting each of the air brake mechanisms 170 and entering each of the second hose segments 95, thereby leading to the air brake mechanisms 170 forming a boundary at which each of the fasteners begins to decelerate after having been continuously accelerated prior to reaching one of the air brake mechanisms 170.

Each of the fasteners continues onward while decelerating towards one of the inlet conduits 245, 246 of one of the dispensers 230 while again passing through one of the presence sensors 248, 249. The presence sensors 248, 249 send a control signal to the controller 12 indicating that one of the fasteners has reached one of the dispensers 230. The controller 12 in turn actuates the corresponding one of the valves 155 to cease the supply of the pressurized air to the pathway having the fastener therein.

The fixture assembly 6 is rotated to a position wherein one of the pallet fixtures 305 devoid of the pallet boards 310 is disposed at one of the doors 501, 502 of the loading station. The operator positions a plurality of the pallet boards 310 relative to the pallet fixture 305 using the guides 308 and locks the position of the pallet boards 310 using one of the locking mechanisms 316. Once the pallet fixture 305 is fully prepared, the fixture assembly 6 is rotated 90 degrees to place the prepared pallet fixture 305 adjacent the manipulator 16 while the oppositely arranged and unprepared pallet fixture is positioned adjacent the one of the doors 501, 502 that was not used in the prior loading step. The operator can accordingly address the other door 501, 502 and prepare the other of the pallet fixtures 305 while the previously prepared pallet fixture 305 is addressed by the manipulator 16. This cycle is repeated to continuously prepare the pallet fixtures 305 for subsequent manipulation via the manipulator 16.

The EOAT 210 is maneuvered by the controller 12 to known positions corresponding to the positions at which the fasteners should be driven into a workpiece such as the pallet boards 310 when the prepared pallet fixture 305 is positioned adjacent the manipulator 16. The EOAT 210 is accordingly oriented and positioned relative to the prepared pallet fixture 305 and approaches the pallet boards 310 while attempting to reach a benchmark position for driving the fasteners into the pallet boards 310. As the EOAT 210 approaches the benchmark position, the spring mechanisms 219 coupled to each of the dispensers 230 are compressed upon each of the dispensing heads 258 making contact with a surface of one of the pallet boards 310. The spring mechanisms 219 allow for a sliding of each of the dispensers 230 relative to the frame assembly 212 of the EOAT 210 to prevent penetration of an outer surface of each of the pallet boards 310 by one of the dispensing heads 258 due to excessive forces present therebetween.

The toggle block 250 is continuously actuated between the first and second positions to continuously and alternatingly receive one of the fasteners in one of the fastener openings 251, 252 via one of the inlet conduits 245, 246. Each of the fastener openings 251, 252 not receiving one of the fasteners is positioned in alignment with the piston 236 for the driving of one of the fasteners. The piston 236 is driven towards the fastener while the fastener is gripped by the alignment fingers 263, 264 of the fastener alignment mechanism 261. The fastener is accordingly driven into the surface of one of the pallet boards 310 for coupling a plurality of the pallet boards 310 together to form the pallet.

The EOAT 210 continuously moves the dispensers 230 to desired positions via control of the controller 12 for dispensing the fasteners. The pallet fixture 305 acting as the workpiece may be rotated 180 degrees to allow for the dispensers 230 to dispense the fasteners into the pallet boards 310 from an opposite direction, as desired. The rotation of the pallet fixture 305 may be controlled by the controller 12 based on the known progress of the EOAT 210, as desired.

The dispensers 230 eventually complete the driving of the fasteners into the pallet boards 310 to form a completed pallet. The corresponding locking mechanisms 316 of the pallet fixture 305 may then be automatically released via the controller 12 to allow for the completed pallet to be removed from the pallet fixture 305. Upon release of the pallet, the EOAT 210 is maneuvered to place the grippers 280 in gripping engagement with a portion of the completed pallet. The grippers 280 grip the pallet and reposition the pallet to one of the conveyers of the unloading system 8. The EOAT 210 is again repositioned to drive fasteners into another of the pallet fixtures 305 that was being prepared by the operator during the driving of the fasteners into the recently completed pallet.

One skilled in the art should understand that various different aspects of the present invention may be adapted for alternative uses and configurations without departing from the scope of the present invention. For example, the dispenser may be adapted to be in the form of a hand manipulated tool disposed at the end of one of the hoses rather than being coupled to a manipulator, but the structure upstream of the dispenser may remain substantially unchanged. Similarly, the dispenser may be coupled to any substantially automated mechanism suitable for performing a specified task other than the illustrated manipulator 16 having multiple degrees of freedom. The dispenser may for example be configured for an assembly line-like configuration wherein the dispenser only needs repetitive vertical translation to continuously apply fasteners to a stream of products translated below the dispenser, hence in this example the dispenser can be coupled to any device suitable for exclusively controlling an elevation of the dispenser. The dispensers may also be adapted to receive a supply of the fasteners from fewer or more of the pathways than illustrated and described. For example, the dispenser may be in communication with three of the pathways or the dispenser may be in communication with only one of the pathways. If in communication with three of the pathways, each of the dispensers may include a toggle block having three openings formed therethrough and an actuating device configured for actuating the toggle block to each of three different rotational positions for receiving the fasteners from three of the pathways.

The air brake mechanism 170 has been found to be a critical component regarding a maintaining of the durability of the assembly system 2. The manner in which the air brake mechanism 170 decelerates each of the fasteners at an intermediate point between the introduction of the pressurized air and each of the dispensers 230 beneficially reduces the wear experienced by the components disposed downstream of the air brake mechanisms 170. The air brake mechanisms 170 also prevent damage to the fasteners as they are slowed significantly prior to eventually contacting the outer surface 259 of the dispensing head 258. The reduced speed of the fasteners has also been found to reduce wear of the second hose segments 95 downstream of the air brake mechanisms 170.

The manner in which each of the dispensers 230 is alternatingly in communication with one of two independent pathways allowing passage of the fasteners also provides the advantage that each of the dispensers 230 can receive another one of the fasteners while a previously transferred fastener is being driven by the dispenser 230. This in turn increases the speed at which each of the dispensers 230 can drive another fastener without presenting a situation wherein the subsequent fastener interferes with the previously received fastener due to the separation of the pathways encountering each of the dispensers 230. As such, the fastener delivery system 3 can supply the fasteners to each of the dispensers 230 at a rate consistent with the desired rate of dispensing the fasteners during a manufacturing process. Additionally, as mentioned hereinabove, the fastener delivery system 3 may be modified to include additional pathways for the fasteners to follow if an increased rate of delivery of the fasteners is desired, and the corresponding dispenser 230 may be adapted to receive the fasteners from additional pathways to accommodate the increased rate of the fasteners reaching the dispenser 230.

The use of the spring mechanisms 219 and the fastener alignment mechanisms 261 further ensures that each of the fasteners is properly driven into the corresponding workpiece at both a desired orientation and a desired depth of penetration. This feature accordingly allows for a plurality of the dispensers 230 to be used for various different applications without comprising the quality of the resulting product. For example, the ability to drive the fasteners at different elevations relative to the approach direction of each of the dispensers 230 allows for coupling operations to be carried out on irregularly shaped products having surfaces with varying heights in addition to overcoming the problem of inconsistencies formed in a single board, as explained above.

The distributor 20 also beneficially allows for one supply of the fasteners to be divided and distributed to the individual outlet assemblies 50 for causing the fasteners to be transported to a plurality of different dispensers 230 when a plurality of the dispensers 230 are required for efficiently achieving a desired task using the fastener delivery system 3. The distributor 20 is also relatively inexpensive to manufacture as each of the actuators suitable for causing linear translation are able to be formed as cost effective pneumatic actuators.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fastener delivery system for transporting and dispensing fasteners, the fastener delivery system comprising:
   a source of pressurized air;
   a dispenser configured for dispensing each of the fasteners into a workpiece;
   a first pathway providing a passageway for the fasteners to pass through, wherein the first pathway is placed in selective fluid communication with the source of pressurized air to convey one of the fasteners disposed in the first pathway towards the dispenser;
   a second pathway providing a passageway for the fasteners to pass through, wherein the second pathway is placed in selective fluid communication with the source of pressurized air to blow one of the fasteners disposed in the second pathway towards the dispenser, wherein the dispenser includes a toggle block in selective communication with each of the first pathway and the second pathway, wherein the toggle block is actuated between a first position and a second position, the first position corresponding to the toggle block receiving one of the fasteners originating from the first pathway while one of the fasteners originating from the second pathway is dispensed by the dispenser and the second position corresponding to the toggle block receiving one of the fasteners originating from the second pathway while one of the fasteners originating from the first pathway is dispensed by the dispenser.

2. The fastener delivery system of claim 1, wherein an air brake mechanism is formed in the first pathway upstream of the dispenser with respect to a direction of a flow of the pressurized air through the first pathway.

3. The fastener delivery system of claim 2, wherein the air brake mechanism includes a fastener passageway for passing each of the fasteners therethrough and at least one escape opening intersecting the fastener passageway for expelling a portion of the flow of the pressurized air from the first pathway.

4. The fastener delivery system of claim 3, wherein each of the at least one escape openings extends at least partially in a radially outward direction of the fastener passageway of the air brake mechanism and at least partially in a direction of travel of each of the fasteners through the fastener passageway of the air brake mechanism.

5. The fastener delivery system of claim 1, wherein a first presence sensor determines when one of the fasteners has entered the first pathway, wherein the first pathway is selectively placed in fluid communication with the source of pressurized air in response to the determination that one of the fasteners has entered the first pathway.

6. The fastener delivery system of claim 5, wherein a second presence sensor determines when the one of the fasteners has been blown to a position adjacent the dispenser, wherein the fluid communication between the source of pressurized air and the first pathway is ceased in response to the determination that the one of the fasteners has been blown to the position adjacent the dispenser.

7. The fastener delivery system of claim 1, wherein the first pathway includes at least one flexible hose segment traversed by each of the fasteners flowing through the first pathway.

8. The fastener delivery system of claim 1, wherein the dispenser includes a reciprocating piston and a fastener alignment mechanism, the fastener alignment mechanism including a pair of alignment fingers urged towards one of the fasteners received within the dispenser by a pair of spring elements disposed on opposing sides of the fastener alignment mechanism.

9. The fastener delivery system of claim 8, wherein each of the pair of the alignment fingers is configured to progressively pivot away from the one of the fasteners received within the dispenser against the urging of the pair of the spring elements as the piston is extended into between the pair of the alignment fingers.

10. The fastener delivery system of claim 1, further comprising a distributor for distributing a supply of the fasteners between the first pathway and the second pathway.

11. The fastener delivery system of claim 1, wherein the fastener delivery system includes a plurality of the dispensers, each of the dispensers in communication with a pair of independent pathways configured to receive the fasteners and blow the fasteners towards one of the dispensers.

12. The fastener delivery system of claim 11, further comprising a distributor for distributing a supply of the fasteners to each of the plurality of the dispensers.

\* \* \* \* \*